США010673677B2

United States Patent
Wu

(10) Patent No.: US 10,673,677 B2
(45) Date of Patent: Jun. 2, 2020

(54) SINGLE CARRIER-BASED DATA TRANSMISSION METHOD AND APPARATUS

(71) Applicant: HUAWEI TECHNOLOGIES CO., LTD., Shenzhen, Guangdong (CN)

(72) Inventor: Tao Wu, Shenzhen (CN)

(73) Assignee: HUAWEI TECHNOLOGIES CO., LTD., Shenzhen, Guangdong (CN)

( * ) Notice: Subject to any disclaimer, the term of this patent is extended or adjusted under 35 U.S.C. 154(b) by 0 days.

(21) Appl. No.: 16/179,449

(22) Filed: Nov. 2, 2018

(65) Prior Publication Data

US 2019/0075008 A1 Mar. 7, 2019

Related U.S. Application Data

(63) Continuation of application No. PCT/CN2017/076822, filed on Mar. 15, 2017.

(30) Foreign Application Priority Data

| May 6, 2016 | (CN) | 2016 1 0298397 |
| Jun. 13, 2016 | (CN) | 2016 1 0415525 |
| Sep. 29, 2016 | (CN) | 2016 1 0860787 |

(51) Int. Cl.
*H04L 27/36* (2006.01)
*H04L 27/38* (2006.01)
*H04L 1/00* (2006.01)

(52) U.S. Cl.
CPC .......... *H04L 27/361* (2013.01); *H04L 1/0058* (2013.01); *H04L 1/0071* (2013.01); *H04L 27/38* (2013.01)

(58) Field of Classification Search
CPC ..... H04L 27/361; H04L 27/38; H04L 1/0058; H04L 1/0071
See application file for complete search history.

(56) References Cited

U.S. PATENT DOCUMENTS

| 10,412,744 B2* | 9/2019 | Chun | H04L 1/00 |
| 2006/0088023 A1* | 4/2006 | Muller | H04H 20/67 370/350 |

(Continued)

FOREIGN PATENT DOCUMENTS

| CN | 1317903 A | 10/2001 |
| CN | 1929615 A | 3/2007 |

(Continued)

OTHER PUBLICATIONS

IEEE Std. 802.11ac.TM.-2013, "Part 11: Wireless LAN Medium Access Control (MAC) and Physical Layer (PHY) Specifications", (Year: 2013).*

(Continued)

*Primary Examiner* — Afsar M Qureshi
(74) *Attorney, Agent, or Firm* — Womble Bond Dickinson (US) LLP

(57) ABSTRACT

Embodiments of the present disclosure describe a single carrier-based data transmission method and apparatus. The method may include generating a frame and sending the frame. A data part of the frame includes 2N data blocks, the 2N data blocks are arranged in a sequence from the first data block to the $2N^{th}$ data block. Furthermore, the data block includes a payload part and a guard interval (GI), payload parts of different data blocks are separated by GIs, and a payload part of the $2N^{th}$ data block is obtained by multiplying a payload part of the $(2n-1)^{th}$ data block by a phase-shift sequence, where n=1, 2, ..., N, and N is an integer greater than 0. By using the foregoing manner, data transmission robustness can be improved and data transmission for a longer distance can be supported.

18 Claims, 19 Drawing Sheets

(56) References Cited

U.S. PATENT DOCUMENTS

| | | | |
|---|---|---|---|
| 2007/0019579 A1* | 1/2007 | Xu | H04H 20/42 370/312 |
| 2009/0052561 A1* | 2/2009 | Baxley | H04B 1/59 375/260 |
| 2011/0228815 A1* | 9/2011 | Nakamura | H04B 7/0615 375/130 |
| 2012/0148255 A1* | 6/2012 | Liu | H04B 10/50 398/136 |
| 2014/0029681 A1 | 1/2014 | Zhang et al. | |
| 2016/0308687 A1* | 10/2016 | Nickel | H04L 12/4013 |
| 2016/0330738 A1* | 11/2016 | Eitan | H04L 27/2646 |
| 2017/0280462 A1 | 9/2017 | Chun et al. | |

FOREIGN PATENT DOCUMENTS

| | | | | |
|---|---|---|---|---|
| CN | 101088236 A | 12/2007 | | |
| CN | 101286966 A | 10/2008 | | |
| EP | 1742393 A2 * | 1/2007 | | H04H 20/42 |
| WO | 2016028124 A1 | 2/2016 | | |
| WO | WO-2016028124 A1 * | 2/2016 | | H04W 84/04 |

OTHER PUBLICATIONS

"IEEE Standard for Information technology—Telecommunications and information exchange between systems Local and metropolitan area networks", IEEE Std 802.11ac.TM.-2013.*

IEEE Std 802.111™-2012, IEEE Standard for Information technology—Telecommunications and information exchange between systems Local and metropolitan area networks—Specific requirements, Part 11: Wireless LAN Medium Access Control (MAC) and Physical Layer (PHY) Specifications. Mar. 29, 2012, 2793 pages.

ISO/IEC/IEEE 8802-11:2012/Amd.3:2014(E), Information technology—Telecommunications and information exchange between systems—Local and metropolitan area networks—Specific requirements—Part 11:Wireless LAN medium access control (MAC) and physical layer (PHY) specifications, Amendment 3: Enhancements for very high throughput in the 60 GHz band(adoption of IEEE Std 802.11ad-2012), Mar. 15, 2014, 634 pages.

* cited by examiner

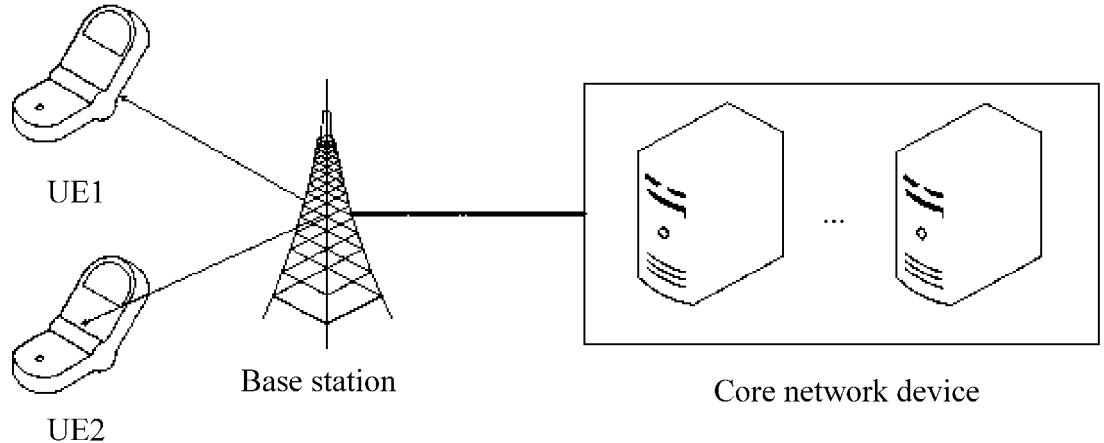

FIG. 2

Generate a frame, where a data part of the frame includes 2N data blocks, the 2N data blocks are arranged in a sequence from the first data block to the $2N^{th}$ data blocks, the data block includes a payload part and a guard interval GI, payload parts of different data blocks are separated using GIs, and a payload part of the $2n^{th}$ data block is obtained by multiplying a payload part of the $(2n-1)^{th}$ data block by a phase-shift sequence, where n=1,2...,N, and N is an integer greater than 0 ⟵ 201

Send the frame ⟵ 202

FIG. 3

Data block 2n-1: | GI | $s_{n,1}, \cdots, s_{n,336}$ | Symbols of another code block |

Data block 2n: | GI | $s_{n',1}, \square\ s_{n',336}$ | Symbols of another code block |

$$s_{n',k} = s_{n,k} e^{j\frac{2\pi\Delta N}{N}k}, k = 1,2,\ldots,336$$

FIG. 8

| Data block 2n-1 | | Data block 2n | |
|---|---|---|---|
| GI | $s_{n,1}, \cdots, s_{n,168}$ Symbols of another code block | GI | $s_{n',1}, \square\ s_{n',168}$ Symbols of another code block |

$$s_{n',k} = s_{n,k} e^{j\frac{2\pi\Delta N}{N}k}, k=1,2,\ldots,168$$

FIG. 9

$$s_{n',k} = s_{n,k} e^{j\frac{2\pi \Delta N}{N} k}, k = 1, 2, \ldots, 168$$

$$s_{n+l,k} = s_{n,k} e^{j\frac{2\pi \Delta N_l}{N} k}, k = 1, 2, \ldots, L$$

BPSK | GI | $\hat{s}(0),$ ... , $\hat{s}(447)$ | GI | $\hat{s}(448),$ ... , $\hat{s}(671), \hat{s}_1(0),$ ... , $\hat{s}_1(223)$ | GI | $\hat{s}_1(224),$ ... , $\hat{s}_1(671)$ | GI |

QPSK | GI | $\hat{s}(0),$ ... , $\hat{s}(335), \hat{s}_1(0),$ ... , $\hat{s}_1(111)$ | GI | $\hat{s}_1(112),$ ... , $\hat{s}_1(335),$ ... | GI |

16QAM | GI | $\hat{s}(0),$ ... , $\hat{s}(167), \hat{s}_1(0),$ ... , $\hat{s}_1(367),$ ... | GI |

64QAM | GI | $\hat{s}(0),$ ... , $\hat{s}(111), \hat{s}_1(0),$ ... , $\hat{s}_1(131),$ ... | GI |

FIG. 16

BPSK | GI | $\hat{s}(0),\cdots,$ | $\hat{s}(447)$ | GI | $\hat{s}(448),\cdots,\hat{s}(671),\hat{s}_1(0),\cdots,\hat{s}_1(223)$ | GI | $\hat{s}_1(224),\cdots,\hat{s}_1(671)$ | GI QPSK | GI | $\hat{s}(0),\cdots,\hat{s}(335),\hat{s}_1(0),\cdots,\hat{s}_1(111)$ | GI | $\hat{s}_1(112),\cdots,\hat{s}(335),\cdots$ 16QAM | GI | $\hat{s}(0),\cdots,\hat{s}(167),\hat{s}_1(0),\cdots,\hat{s}_1(167),\cdots$ 64QAM | GI | $\hat{s}(0),\cdots,\hat{s}(111),\hat{s}_1(0),\cdots,\hat{s}_1(111),\cdots$

FIG. 18

SINGLE CARRIER-BASED DATA TRANSMISSION METHOD AND APPARATUS

CROSS-REFERENCE TO RELATED APPLICATIONS

This application is a continuation of International Application No. PCT/CN2017/076822, filed on Mar. 15, 2017, which claims priority to Chinese Patent Application No. 201610298397.6, filed on May 6, 2016, Chinese Patent Application No. 201610415525.0, filed on Jun. 13, 2016, and Chinese Patent Application No. 201610860787.8, filed on Sep. 29, 2016. All of the aforementioned patent applications are hereby incorporated by reference in their entireties.

TECHNICAL FIELD

This application pertains to the field of communications technologies, and in particular, to a single carrier-based data transmission method and apparatus.

BACKGROUND

The 802.11 family of standards standardizes wireless local area networks (WLANs), greatly reducing deployment costs of WLAN technologies. Wireless Fidelity (WiFi) is a wireless network communications technology brand held by the WiFi Alliance, and is intended to improve interconnectivity between wireless network products that are based on the 802.11 standards. A wireless local area network using the 802.11 protocol family may be referred to as a WiFi network. In WiFi that uses a high frequency of 60 GHz, the existing standard 802.11ad does not support long distance (50-100 meters) transmission.

SUMMARY

In view of this, this application provides a single carrier-based data transmission method and apparatus, used to resolve a problem that the existing standard 802.11ad does not support long distance transmission.

According to an aspect, an embodiment of this application provides a single carrier-based data transmission method, applied to a wireless communications system operating at 6 GHz or higher. The method includes: generating a frame and sending the frame. A data part of the frame includes 2N data blocks, the 2N data blocks are arranged in a sequence from a first data block to a $2N^{th}$ data block, each data block includes a payload part and a guard interval (GI), payload parts of different data blocks are separated by GIs, and a payload part of a $2n^{th}$ data block is obtained by multiplying a payload part of a $(2n-1)^{th}$ data block by a phase-shift sequence, where n=1, 2, ..., N, and N is an integer greater than 0. By using the solution of this embodiment of this application, data transmission robustness can be improved, and data transmission for a longer distance can be supported.

Setting of a phase-shift coefficient of the phase-shift sequence includes at least the following embodiments.

In a possible embodiment, the phase-shift coefficient of the phase-shift sequence is stipulated in a standard, and the phase-shift coefficient includes: 90°, 180°, or 270°.

In another possible embodiment, a signaling part of the frame includes a phase field, and the phase field includes 1 bit, where: when the phase field is a first value, the phase-shift coefficient of the phase-shift sequence is 0°; or when the phase field is a second value, the phase-shift coefficient of the phase-shift sequence is 180°.

In still another possible embodiment, a signaling part of the frame includes a phase field, and the phase field includes at least 2 bits, where: when the phase field is a first value, the phase-shift coefficient of the phase-shift sequence is 0°; when the phase field is a second value, the phase-shift coefficient of the phase-shift sequence is 90°; when the phase field is a third value, the phase-shift coefficient of the phase-shift sequence is 180°; or when the phase field is a fourth value, the phase-shift coefficient of the phase-shift sequence is 270°.

When the foregoing embodiment is used for the phase-shift sequence, when the phase field is "0" or "00", phase rotation is not performed on the payload part of the data block, thereby ensuring compatibility with a previous-generation standard; or when the phase field is another value, phase rotation is performed, so that data transmission robustness is improved through diversity combining at a receiver.

In a possible embodiment, before the frame is generated at a transmit end, the method further includes: receiving channel feedback information, where the channel feedback information includes the phase-shift coefficient.

In a possible embodiment, a payload part of a data block includes 448 symbols, and a guard interval of a data block includes 64 symbols.

According to another aspect, an embodiment of this application provides a single carrier-based data transmission method. The data transmission method includes: generating a frame and sending the frame. A data part of the frame includes a plurality of data blocks. each data block includes a payload part and a guard interval (GI). Payload parts of different data blocks are separated by GIs. A first signal and a reversed first signal form a matrix, and the matrix is multiplied by a matrix Q to obtain the payload part of the data block. By using the foregoing manner, the data transmission method can be used to improve data transmission robustness and support data transmission for a longer distance.

According to another aspect, an embodiment of this application provides a single carrier-based data transmission apparatus, applied to a wireless communications system operating at 6 GHz or higher. The apparatus includes a baseband processor, configured to generate a frame. The apparatus further includes a transceiver, configured to send the frame. A data part of the frame includes 2N data blocks, the 2N data blocks are arranged in a sequence from a first data block to a $2N^{th}$ data block, the data block includes a payload part and a guard interval (GI), payload parts of different data blocks are separated by GIs, and a payload part of a $2n^{th}$ data block is obtained by multiplying a payload part of a $(2n-1)^{th}$ data block by a phase-shift sequence, where n=1, 2, ..., N, and N is an integer greater than 0. By using the solution of this embodiment of this application, data transmission robustness can be improved, and data transmission for a longer distance can be supported.

Setting of a phase-shift coefficient of the phase-shift sequence includes at least the following embodiments.

In a possible embodiment, the phase-shift coefficient of the phase-shift sequence is stipulated in a standard, and the phase-shift coefficient includes: 90°, 180°, or 270°.

In another possible embodiment, a signaling part of the frame generated by the baseband processor includes a phase field, and the phase field includes 1 bit, where: when the phase field is a first value, the phase-shift coefficient of the phase-shift sequence is 0°; or when the phase field is a second value, the phase-shift coefficient of the phase-shift sequence is 180°.

In still another possible embodiment, a signaling part of the frame generated by the baseband processor includes a phase field, and the phase field includes at least 2 bits, where: when the phase field is a first value, the phase-shift coefficient of the phase-shift sequence is 0°; when the phase field is a second value, the phase-shift coefficient of the phase-shift sequence is 90°; when the phase field is a third value, the phase-shift coefficient of the phase-shift sequence is 180°; or when the phase field is a fourth value, the phase-shift coefficient of the phase-shift sequence is 270°.

When the foregoing embodiment is used for the phase-shift sequence, when the phase field is "0" or "00", phase rotation is not performed on the payload part of the data block, thereby ensuring compatibility with a previous-generation standard; or when the phase field is another value, phase rotation is performed, so that data transmission robustness is improved through diversity combining at a receiver.

In a possible embodiment, before the baseband processor generates the frame, the transceiver is further configured to receive channel feedback information, where the channel feedback information includes the phase-shift coefficient.

In a possible embodiment, a payload part of a data block includes 448 symbols, and a guard interval of the data block includes 64 symbols.

According to another aspect, an embodiment of this application provides a single carrier-based data transmission apparatus. The apparatus is configured to generate a frame and send the frame. A data part of the frame includes a plurality of data blocks. The data block includes a payload part and a guard interval (GI). Payload parts of different data blocks are separated by GIs. A first signal and a reversed first signal form a matrix, and the matrix is multiplied by a matrix Q to obtain the payload part of the data block. By using the foregoing manner, data transmission robustness can be improved and data transmission for a longer distance can be supported.

This application provides a single carrier-based data transmission method and apparatus. The transmit end generates the frame and sends the frame. The data part of the frame includes 2N data blocks, the 2N data blocks are arranged in a sequence from the first data block to the $2N^{th}$ data block, each data block includes a payload part and a guard interval (GI), the payload parts of the different data blocks are separated using the GIs, and a payload part of a $2n^{th}$ data block is obtained by multiplying a payload part of a $(2n-1)^{th}$ data block by the phase-shift sequence, where n=1, 2, . . . , N, and N is an integer greater than 0. By using the foregoing manner, data transmission robustness can be improved and data transmission for a longer distance can be supported.

BRIEF DESCRIPTION OF DRAWINGS

FIG. 2 is a diagram of an application scenario of a cellular communications network;

FIG. 3 is a flowchart of a method according to Embodiment 1 of this application;

FIG. 8 is a fourth subgraph of signal processing in a data block according to an embodiment of this application;

FIG. 9 is a fifth subgraph of signal processing in a data block according to an embodiment of this application;

FIG. 16 is a structural diagram of a frame according to Embodiment 5 of this application;

FIG. 18 is a structural diagram of a frame according to Embodiment 6 of this application;

DESCRIPTION OF EMBODIMENTS

To make the objectives, technical solutions, and advantages of this application clearer, the following further describes the embodiments of this application in detail with reference to the accompanying drawings. To facilitate comprehensive understanding of this application, the following detailed description mentions many specific details.

Figure 1:
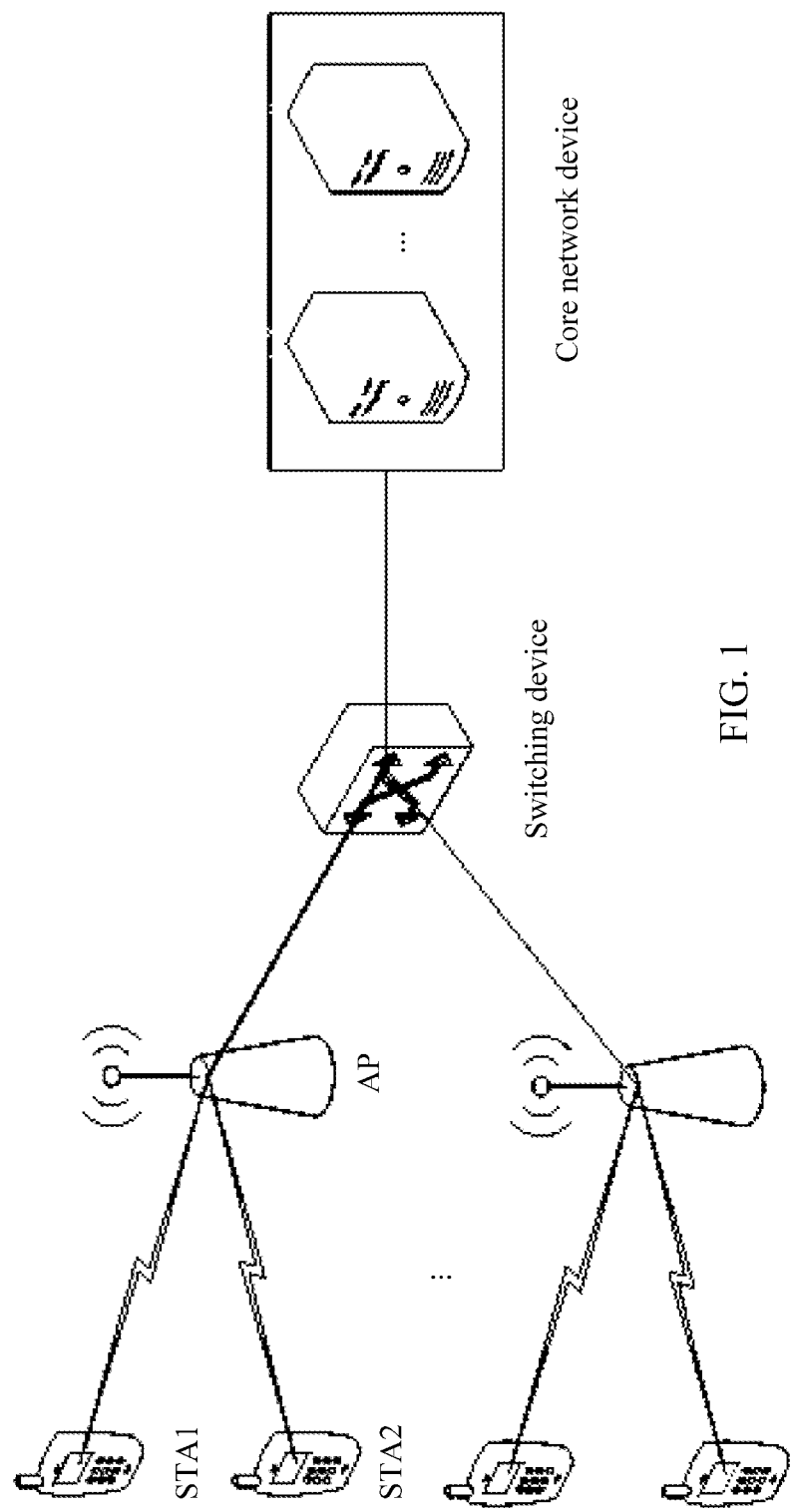
FIG. 1 is a diagram of an application scenario of a wireless local area network.

The embodiments of this application may be applied to a WLAN. Currently, the WLAN uses the IEEE 802.11 family of standards. The WLAN may include a plurality of basic service sets (BSS). The plurality of BSSs are connected to a core network device by using a switching device, as shown in FIG. 1. Each basic service set may include one access point (AP) station and a plurality of non-access point stations Non-AP STA).

The access point station is also referred to as a wireless access point, a hotspot, or the like. APs are mainly deployed in a home, inside a building, and inside a park. A typical coverage radius is tens of meters to hundreds of meters. An AP is equivalent to a bridge that connects a wired network and a wireless network. A major function of the AP is to connect various wireless network clients and connect the wireless network to Ethernet. Specifically, the AP may be a WiFi chip, a terminal device with a WiFi chip, or a network device with a WiFi chip. The AP may support a plurality of standards such as 802.11ay, 802.11ad, 802.11ax, 802.11ac, 802.11n, 802.11g, 802.11b, and 802.11a.

The non-access point station (Non-AP STA) may be a wireless communications chip, a wireless sensor, or a wireless communications terminal. Specifically, the non-access point station may be, for example, a smartphone, a tablet computer, and a personal computer that support a WiFi communications function, a set top box and a smart TV that support a WiFi communications function, a smart wearable device that supports a WiFi communications function, an in-vehicle communications device that supports a WiFi communications function, and an unmanned aerial vehicle that supports a WiFi communications function. The station may support a plurality of standards such as 802.11ay, 802.11ad, 802.11ax, 802.11ac, 802.11n, 802.11g, 802.11b, and 802.11a. It should be noted that the Non-AP STA is referred to as a STA in the following.

The embodiments of this application may also be applied to a cellular communications system. The cellular communications system generally includes a cell. Each cell includes one base station (BS). The base station provides a communications service for user equipment UE), and the base station is connected to a core network device, as shown in FIG. 2.

It should be noted that the cellular communications system mentioned in the embodiments of this application includes but is not limited to: a Narrowband-Internet of Things NB-IoT) system, a Global System for Mobile Communications (GSM), an Enhanced Data rates for GSM Evolution EDGE) system, a Wideband Code Division Multiple Access (WCDMA) system, a Code Division Multiple Access 2000 (CDMA 2000) system, a Time Division-Synchronous Code Division Multiple Access (TD-SCDMA) system, a Long Term Evolution (LTE) system, a next-generation mobile communications system, or the like.

In the embodiments of this application, the base station is an apparatus that is deployed on a radio access network to provide a radio communication function for UE. The base station may include different types of macro base stations, micro base stations (also referred to as small cells), relay stations, access points, and the like. In systems that use different radio access technologies, names of a device that has a base station function may be different. For example, in an LTE system, the device is referred to as an evolved NodeB (evolved NodeB, eNB or eNodeB); and in a 3rd generation (3G) system, the device is referred to as a NodeB (Node B). For ease of description, in all the embodiments of this application, all the foregoing apparatuses that provide a wireless communication function for the UE are referred to as a base station or a BS.

The UE in the embodiments of this application may include various handheld devices, in-vehicle devices, wearable devices, or computing devices that have a wireless communication function, or other processing devices connected to a wireless modem. The UE may also be referred to as a mobile station (MS), a terminal (terminal), or a terminal device (terminal device); and may further include a subscriber unit (subscriber unit), a cellular phone (cellular phone), a smartphone (smartphone), a wireless data card, a personal digital assistant (PDA) computer, a tablet computer, a modem (modem), a handheld device (handheld device), a laptop computer (laptop computer), a machine type communication (MTC) terminal, or the like. For ease of description, the devices mentioned above are collectively referred to as UE in all the embodiments of this application.

Embodiment 1

Embodiment 1 of this application provides a single carrier-based data transmission method. The method may be applied to an access point and a station, for example, an AP, a STA1, and a STA2 in FIG. 1 and a base station, UE1, and UE2 in FIG. 2. FIG. 3 is a flowchart of the data transmission method. Specific steps are as follows:

Step 201: Generate a frame, where a data part of the frame includes 2N data blocks, the 2N data blocks are arranged in a sequence from a first data block to a $2N^{th}$ data block, each data block includes a payload part and a guard interval (GI), payload parts of different data blocks are separated by GIs, and a payload part of a $2n^{th}$ data block is obtained by multiplying a payload part of a $(2n-1)^{th}$ data block by a phase-shift sequence, where n=1, 2, ..., N, and N is an integer greater than 0.

Step 202: Send the frame.

In an embodiment, the data transmission method is applied to a wireless communications system operating at a high frequency. The high frequency includes a frequency band of 6 GHz or higher. Preferably, the data transmission method may be applied to a 28 GHz frequency band or a 60 GHz frequency band.

Figure 4:
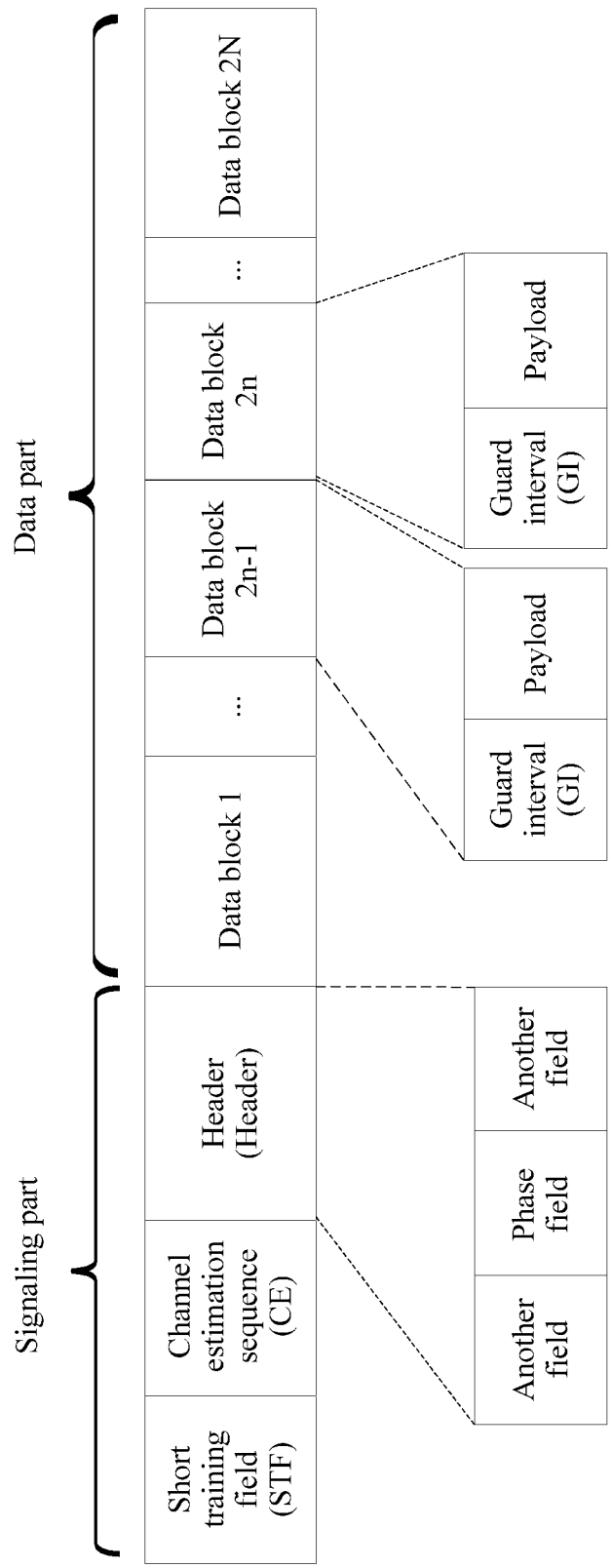
FIG. 4 is a structural diagram of a frame according to an embodiment of this application.

In an embodiment, the frame includes a signaling part and a data part. As shown in FIG. 4, the signaling part includes a short training field (STF), a channel estimation (CE) sequence, and a header (Header) field. The data part of the frame includes 2N data blocks, and the 2N data blocks are arranged in a sequence from a first data block to a $2N^{th}$ data block. each data block includes a payload part and a guard interval (GI), and payload parts of different data blocks are separated by GIs. The payload part of a data block includes 448 symbols, and the guard interval of a data block includes 64 symbols.

It should be noted that the symbols of the payload part of the data block use a binary phase shift keying (BPSK) modulation scheme, a π/2-BPSK modulation scheme, a quadrature phase shift keying (QPSK) modulation scheme, or a π/2-QPSK or 16 QAM (QAM) modulation scheme. The foregoing modulation schemes are applicable to all the embodiments of this application.

Figure 5:
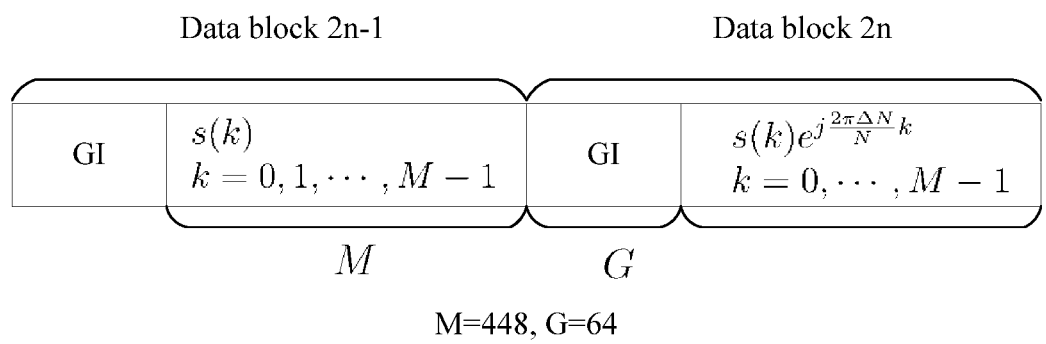
FIG. 5 is a first subgraph of signal processing in a data block according to an embodiment of this application.

Optionally, in step 201, the payload part of the data block 2n is obtained by multiplying the payload part of the data block 2n−1 by the phase-shift sequence. An embodiment of a specific implementation is shown in FIG. 5. Assuming that a payload-part signal of a data block 1 is s(k), a payload-part signal of a data block 2 is $$s(k)*e^{j\frac{2\pi\Delta_N}{N}k}.$$

The phase-shift sequence is $$e^{j\frac{2\pi\Delta_N}{N}k},$$

and $\Delta_N$ is an integer. It should be noted that the payload-part signal of the data block 2 being $$(-1)*s(k)*e^{j\frac{2\pi\Delta_N}{N}k}$$

also falls within the protection scope of this application.

In embodiments, the phase-shift sequence includes at least the following implementations.

Implementation 1: A phase-shift coefficient of the phase-shift sequence is stipulated in a standard, and the phase-shift coefficient includes: 90°, 180°, or 270°. If the phase-shift coefficient is 90°, $\Delta_N=0.25*N$; if the phase-shift coefficient is 180°, $\Delta_N=0.5*N$; or if the phase-shift coefficient is 270°, $\Delta_N=0.75*N$.

Implementation 2: The signaling part of the frame includes a phase field, and the phase field includes 1 bit. When the phase field is a first value, a phase-shift coefficient of the phase-shift sequence is 0°; or when the phase field is a second value, a phase-shift coefficient of the phase-shift sequence is 180°. For example, when the phase field is "0", $\Delta_N=0$, and the phase-shift coefficient is 0°; or when the phase field is "1", $\Delta_N=0.5*N$, and the phase-shift coefficient is 180°.

Implementation 3: The signaling part of the frame includes a phase field, and the phase field includes at least 2 bits. When the phase field is a first value, a phase-shift coefficient of the phase-shift sequence is 0°; when the phase field is a second value, a phase-shift coefficient of the phase-shift sequence is 90°; when the phase field is a third value, a phase-shift coefficient of the phase-shift sequence is 180°; or when the phase field is a fourth value, a phase-shift coefficient of the phase-shift sequence is 270°. For example, the phase field includes 2 bits. When the phase field is "00", $\Delta_N=0$, and the phase-shift coefficient is 0°; when the phase field is "01", $\Delta_N=0.25*N$, and the phase-shift coefficient is 90°; when the phase field is "10", $\Delta_N=0.5*N$, and the phase-shift coefficient is 180°; or when the phase field is "11", $\Delta_N=0.75*N$, and the phase-shift coefficient is 270°.

When Implementations 2 and 3 are used for the phase-shift sequence, when the phase field is "0" or "00", phase rotation is not performed on the payload part of the data block, thereby ensuring compatibility with a previous-generation standard; or when the phase field is another value, phase rotation is performed, so that data transmission robustness is improved through diversity combining at a receiver.

Optionally, the data transmission method further includes step 200.

Step 200: Before the frame is generated, receive channel feedback information, where the channel feedback information includes the phase-shift coefficient. A transmit end obtains the phase-shift coefficient from the channel feedback information, and then determines a value to be assigned to a phase field of the header part in the to-be-sent frame. It should be noted that step 200 is applicable to Implementations 2 and 3 of the phase-shift sequence.

Figure 6:
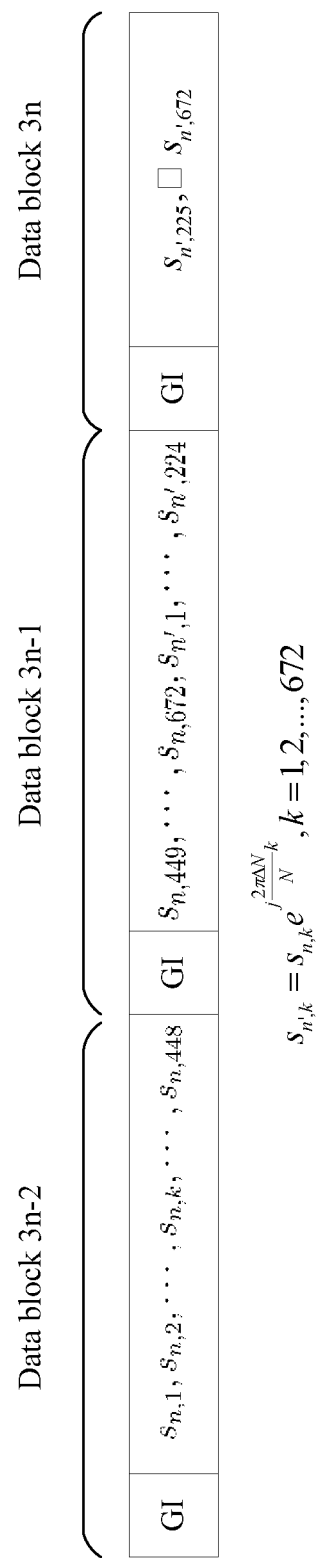
FIG. 6 is a second subgraph of signal processing in a data block according to an embodiment of this application.

Optionally, step 201 further has the following possible implementations:

Step 201*a*: Generate a frame. A data part of the frame includes a plurality of data blocks. The second half of a payload of a data block 3n−1 and a payload part of a data block 3n, are obtained by multiplying, a payload part of a data block 3n−2 and the first half of the payload of the data block 3n−1, by a phase-shift sequence, where n is an integer greater than 0. A structure of the frame in step 201*a* is shown in FIG. 4, and a structure of the data blocks in the frame in step 201*a* is shown in FIG. 6. An information sequence carried in the frame in step 201*a* uses 672 symbols as a code block unit. Three data blocks are needed to implement repeated transmission. The frame in step 201*a* is applicable to all Implementations 1 to 3 of the phase-shift sequence.

Figure 7:
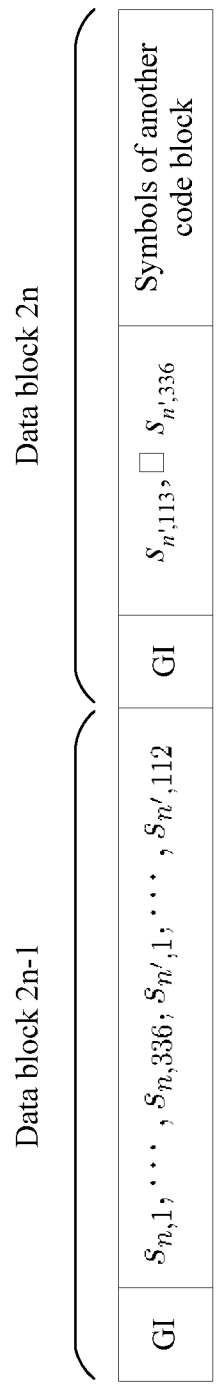
FIG. 7 is a third subgraph of signal processing in a data block according to an embodiment of this application.

Step 201*b*: Generate a frame. A data part of the frame includes a plurality of data blocks. The last ¼ part of a payload of a data block 2n−1 and the first half of a payload of a data block 2n, are obtained by multiplying, the first ¾ part of the payload of the data block 2n−1 by a phase-shift sequence, and the second half of the data block 2n is a symbol of another code block, where n is an integer greater than 0. A structure of the frame in step 201*b* is shown in FIG. 4, and a structure of the data blocks in the frame in step 201*b* is shown in FIG. 7. An information sequence carried in the frame in step 201*b* uses 336 symbols as a code block unit. The frame in step 201*b* is applicable to all Implementations 1 to 3 of the phase-shift sequence.

Step 201*c*: Generate a frame. A data part of the frame includes a plurality of data blocks. The first ¾ part of a payload of a data block 2n is obtained by multiplying the first ¾ part of a payload of a data block 2n−1 by a phase-shift sequence, and the last ¼ parts of the payloads of the data block 2n and the data block 2n−1 are symbols of another code block, where n is an integer greater than 0. A structure of the frame in step 201*c* is shown in FIG. 4, and a structure of the data blocks in the frame in step 201*c* is shown in FIG. 8. An information sequence carried in the frame in step 201*c* uses 336 symbols as a code block unit. The frame in step 201*c* is applicable to all Implementations 1 to 3 of the phase-shift sequence.

Step 201*d*: Generate a frame. A data part of the frame includes a plurality of data blocks. The first ⅜ part of a payload of a data block 2n is obtained by multiplying the first ⅜ part of a payload of a data block 2n−1 by a phase-shift sequence, and the last ⅝ parts of the payloads of the data block 2n and the data block 2n−1 are symbols of another code block, where n is an integer greater than 0. A structure of the frame in step 201*d* is shown in FIG. 4, and a structure of the data blocks in the frame in step 201*d* is shown in FIG. 9. An information sequence carried in the frame in step 201*d* uses 168 symbols as a code block unit. The frame in step 201*d* is applicable to all Implementations 1 to 3 of the phase-shift sequence.

Figure 10:
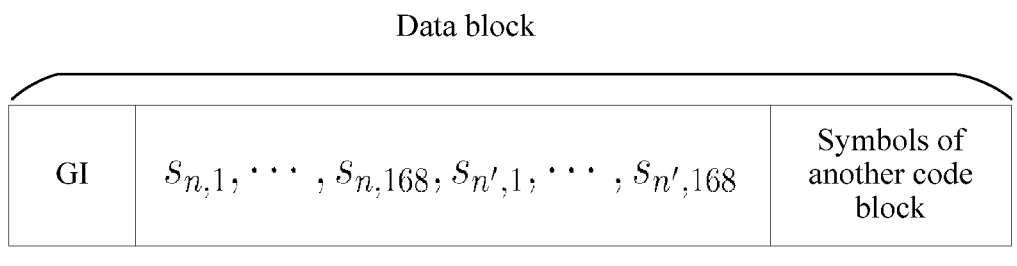
FIG. 10 is a sixth subgraph of signal processing in a data block according to an embodiment of this application.

Step 201*e*: Generate a frame. A data part of the frame includes a plurality of data blocks. The $169^{th}$ symbol to the $336^{th}$ symbol of a payload of a data block n are obtained by multiplying the first 168 symbols of the payload of the data block n by a phase-shift sequence, and the last 112 symbols of the payload of the data block n are symbols of another code block, where n is an integer greater than 0. A structure of the frame in step 201*e* is shown in FIG. 4, and a structure of the data blocks in the frame in step 201*e* is shown in FIG. 10. An information sequence carried in the frame in step 201*e* uses 168 symbols as a code block unit. The frame in step 201*e* is applicable to all Implementations 1 to 3 of the phase-shift sequence.

Figure 11:
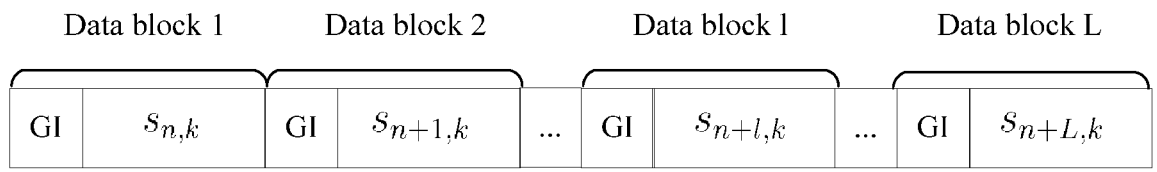
FIG. 11 is a seventh subgraph of signal processing in a data block according to an embodiment of this application.

Step 201*f*: Generate a frame. A data part of the frame includes a plurality of data blocks. A payload of a data block n+1 is obtained by multiplying a payload of a data block n by a phase-shift sequence, where n is an integer greater than 0. A structure of the frame in step 201*f* is shown in FIG. 4, and a structure of the data blocks in the frame in step 201*f* is shown in FIG. 11. As shown in FIG. 11, content of a data block 1 is multiplied by different phase-shift sequences and is carried in different data blocks, implementing more than two retransmissions. The frame in step 201*f* is applicable to all Implementations 1 to 3 of the phase-shift sequence.

In addition, in the single carrier-based data transmission method, actions of a receiver include at least the following implementations:

Step 1: Receive a frame sent by the transmit end. A data part of the frame includes 2N data blocks, the 2N data blocks are arranged in a sequence from a first data block to a $2N^{th}$ data block, each data block includes a payload part and a guard interval (GI), payload parts of different data blocks are separated by GIs, and a payload part of a $2n^{th}$ data block is obtained by multiplying a payload part of a $(2n-1)^{th}$ data block by a phase-shift sequence, where n=1, 2, ..., N, and N is an integer greater than 0.

Step 2: Parse the frame to obtain the payload part of each data block of the frame, and combine payload parts of the $(2n-1)^{th}$ data block and the $2n^{th}$ data block, where n=1, 2, ..., N, and N is an integer greater than 0.

In embodiments, the action of combining the payload parts of the $(2n-1)^{th}$ data block and the $2n^{th}$ data block includes at least the following implementations:

Implementation 1: A phase-shift coefficient of the phase-shift sequence is stipulated in a standard. The receiver performs a phase-shift operation on the payload part of the $2n^{th}$ data block, where a phase-shift sequence of the receiver is $$e^{-j\frac{2\pi\Delta_N}{N}k}.$$

The receiver combines the payload part of the $2n^{th}$ data block on which phase shifting is performed and the payload part of the $(2n-1)^{th}$ data block. For example, the standard stipulates that the phase-shift coefficient is 180°. In this case, a phase-shift sequence of the transmit end is $$e^{j\frac{2\pi\Delta_N}{N}k},$$

that is, $e^{j\pi k}$. Correspondingly, the phase-shift sequence of the receiver is $$e^{-j\frac{2\pi\Delta_N}{N}k},$$

that is, $e^{-j\pi k}$. A phase factor is removed from the payload part of the $2n^{th}$ data block of the frame through a phase-shift operation at the receiver, implementing combination of the payload part of the $2n^{th}$ data block and the payload part of the $(2n-1)^{th}$ data block.

Implementation 2: The receiver reads a phase-shift coefficient of a phase field in a header field of the frame. The receiver removes, based on the phase-shift coefficient, a phase factor from the payload part of the $2n^{th}$ data block of the frame, implementing combination of the payload part of the $2n^{th}$ data block and the payload part of the $(2n-1)^{th}$ data block. In implementation 2, the phase-shift coefficient of the phase field is not stipulated in a standard, but is carried in the phase field in the header field of the frame. A correspondence between the phase field and the phase-shift coefficient is described in detail above, and details are not described again. A phase-shift operation of the receiver in Implementation 2 is the same as the phase-shift operation of the receiver in Implementation 1, and details are not described again.

It should be noted that the action of combining payload parts of data blocks by the receiver is also applicable to the implementations of steps 201a to 201f.

In summary, this application provides a single carrier-based data transmission method. The data transmission method includes: generating the frame and sending the frame. The data part of the frame includes 2N data blocks, the 2N data blocks are arranged in a sequence from a first data block to a $2N^{th}$ data block, each data block includes a payload part and a guard interval (GI), the payload parts of the different data blocks are separated using the GIs, and a payload part of a $2n^{th}$ data block is obtained by multiplying a payload part of a $(2n-1)^{th}$ data block by the phase-shift sequence, where n=1, 2, ..., N, and N is an integer greater than 0. By using the foregoing manner, data transmission robustness can be improved and data transmission for a longer distance can be supported.

Embodiment 2

Embodiment 2 of this application provides a single carrier-based data transmission method. The method may be applied to an access point and a station, for example, an AP, a STA1, and a STA2 in FIG. 1 and a base station, UE1, and UE2 in FIG. 2.

Step 1: Generate a frame. A data part of the frame includes a plurality of data blocks. Each data block includes a payload part and a guard interval (GI). Payload parts of different data blocks are separated by GIs. A first signal and a reversed first signal form a matrix, and the matrix is multiplied by a matrix Q to obtain the payload part of the data block.

Step 2: Send the frame.

It should be noted that the first signal is a to-be-sent data sequence.

In an embodiment, the data transmission method includes: transmitting a group of to-be-sent signals s(k) twice, where a signal in the second transmission is a result obtained by multiplying a reverse of the signal in the first transmission by a phase-shift sequence. For example, the signal in the first transmission is $s_1(k)=s(k)$, and the signal in the second transmission is $$s_2(k) = s(f(k))e^{j\frac{2\pi\Delta_N}{N}k}.$$

Figure 12:
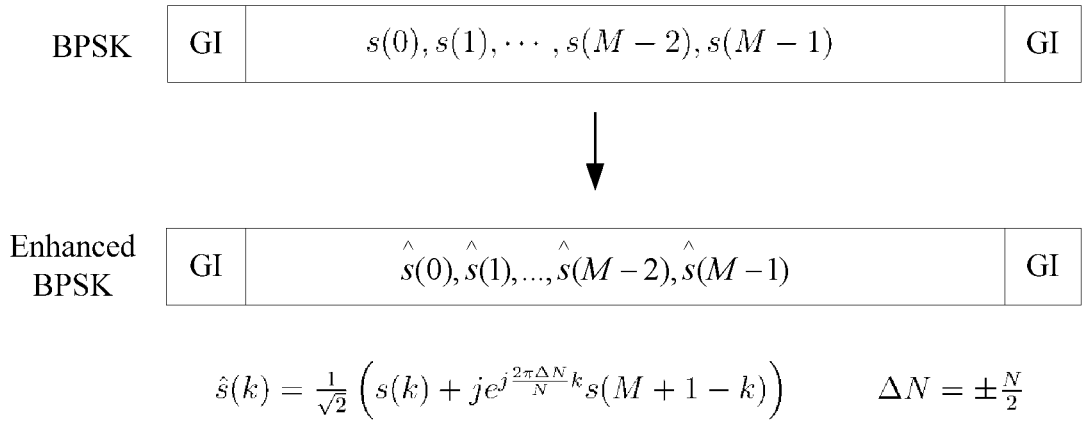
FIG. 12 is an eighth subgraph of signal processing in a data block according to an embodiment of this application.

Then, s1(k), s2(k), and a matrix Q are multiplied to obtain a signal ŝ(k) for transmission, as shown in FIG. 12.

It should be noted that an embodiment of a specific calculation process of obtaining the signal ŝ(k) by multiplying s1(k), s2(k), and the matrix Q is as follows:

$$\begin{bmatrix} \hat{s}(k) \\ \hat{s}(f(k)) \end{bmatrix} = \begin{bmatrix} a & e^{j\frac{2\pi}{N}\Delta_N k}*b \\ e^{j\frac{2\pi}{N}\Delta_N f(k)}*c & d \end{bmatrix} \begin{bmatrix} s(k) \\ s(f(k)) \end{bmatrix},$$

where f(k)=M−1−k, k=0, 1, ..., M−1, and $$\Delta_N = \pm\frac{N}{2}.$$

In an embodiment, when BPSK modulation is performed on s(k), the matrix Q is:

$$Q = \begin{bmatrix} a & b \\ c & d \end{bmatrix} = \frac{1}{\sqrt{2}}\begin{bmatrix} 1 & j \\ j & 1 \end{bmatrix} \text{ or } Q = \begin{bmatrix} a & b \\ c & d \end{bmatrix} = \frac{1}{\sqrt{2}}\begin{bmatrix} 1 & j \\ -j & 1 \end{bmatrix}.$$

In an embodiment, when 16 QAM modulation is performed on s(k), the matrix Q is:

$$Q = \frac{1}{\sqrt{5}}\begin{bmatrix} 1 & 2 \\ 2 & -1 \end{bmatrix}, Q = \frac{1}{\sqrt{5}}\begin{bmatrix} -1 & 2 \\ 2 & 1 \end{bmatrix}, \text{ or } Q = \frac{1}{\sqrt{5}}\begin{bmatrix} 1 & -2 \\ 2 & 1 \end{bmatrix}.$$

In addition, in the single carrier-based data transmission method, actions of a receiver include at least the following implementations:

Step 1: Receive a frame sent by a transmit end. A data part of the frame includes a plurality of data blocks. The data block includes a payload part and a guard interval (GI). Payload parts of different data blocks are separated by GIs. A first signal and a reversed first signal form a matrix, and the matrix is multiplied by a matrix Q to obtain the payload part of the data block.

Step 2: Parse the frame, form a matrix using the payload part of the data block and a reversed payload part of the data block, and multiply the matrix by an inverse matrix of the matrix Q.

In summary, this application provides a single carrier-based data transmission method. The data transmission method includes: generating the frame and sending the frame. The data part of the frame includes a plurality of data blocks.

Each data block includes a payload part and a guard interval (GI). The payload parts of the different data blocks are separated using the GIs. The first signal and the reversed first signal form a matrix, and the matrix is multiplied by the matrix Q to obtain the payload part of the data block. By using the foregoing manner, the data transmission method can be used to improve data transmission robustness and support data transmission for a longer distance.

Embodiment 3

Figure 13:
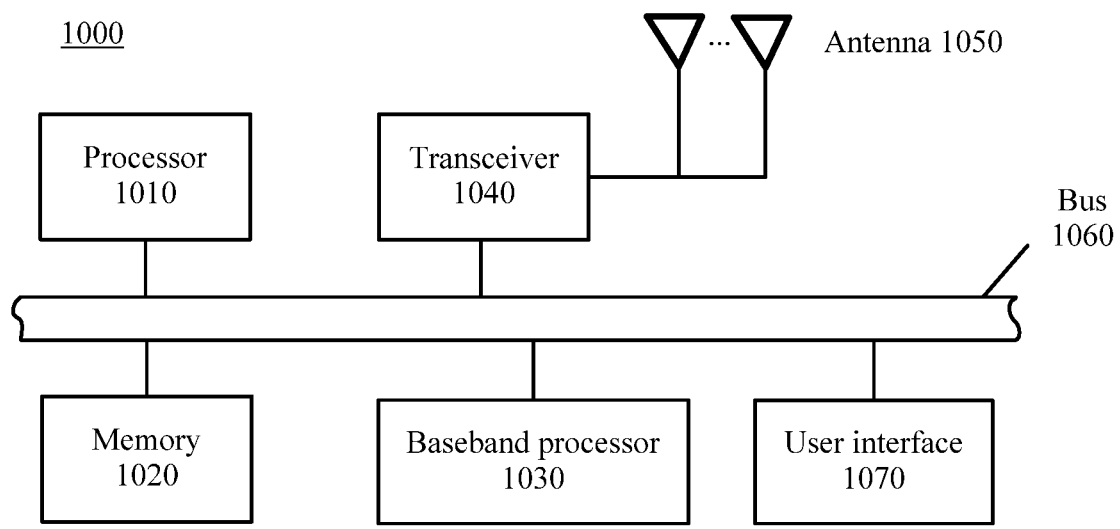
FIG. 13 is a physical structural diagram of an apparatus according to Embodiment 3 of this application.

Embodiment 3 of this application provides a schematic block diagram of a single carrier-based data transmission apparatus. As shown in FIG. 13, the apparatus is, for example, an access point, a station, a base station, or user equipment. Alternatively, the apparatus may be an application-specific integrated circuit (ASIC) or a chip for implementing a related function. The apparatus 1000 includes a processor 1010, a memory 1020, a baseband processor 1030, a transceiver 1040, an antenna 1050, a bus 1060, and a user interface 1070. The apparatus may be the AP and the STA shown in FIG. 1 or the base station and the UE shown in FIG. 2.

In an embodiment, the processor 1010 controls an operation of the apparatus 1000. The processor may be a general-purpose processor, a digital signal processor, an application-specific integrated circuit, a field programmable gate array, or another programmable logic device. The memory 1020 may include a read-only memory and a random access memory, and provides an instruction and data to the processor 1010. A part of the memory 1020 may further include a nonvolatile random access memory (NVRAM). The processor 1010 generally executes a program instruction in the memory 1020 to implement a logical operation and an arithmetic operation of the single carrier-based data transmission method in this application.

The baseband processor 1030 is configured to generate a baseband signal (for example, a frame or a data packet) or parse a received baseband signal to obtain data. The baseband processor includes an encoder and a modulator. The encoder can be used to improve robustness of a baseband signal, to overcome interference and attenuation in a radio propagation environment and reduce errors generated in transmission. The modulator can select a proper signal modulation scheme based on the radio propagation environment.

The transceiver 1040 includes a transmitter circuit and a receiver circuit. The transmitter circuit is configured to perform up-conversion modulation on the baseband signal generated by the baseband processor 1030 to obtain a high-frequency carrier signal. The high-frequency carrier signal is transmitted by using the antenna 1050. The receiver circuit performs a down-conversion operation on a high-frequency signal received by the antenna 1050 to obtain a low-frequency baseband signal. There is one or more antennas 1050. The apparatus 1000 may further include the user interface 1070. The user interface 1070 includes a keyboard, an audio monitoring unit, and/or a touchscreen. The user interface 1070 can transfer content and a control operation to the apparatus 1000.

The components in the apparatus 1000 are coupled by using the bus 1060. In addition to a data bus, the bus system 1060 further includes a power bus, a control bus, and a status signal bus. However, for the purpose of clear description, the various buses are uniformly marked as the bus system 1060 in the figure. It should be noted that the foregoing descriptions of a structure of the access point may be applied to subsequent embodiments.

The baseband processor 1030 is configured to generate a frame, where a data part of the frame includes 2N data blocks, the 2N data blocks are arranged in a sequence from a first data block to a $2N^{th}$ data block, each data block includes a payload part and a guard interval (GI), payload parts of different data blocks are separated by GIs, and a payload part of a $2n^{th}$ data block is obtained by multiplying a payload part of a $(2n-1)^{th}$ data block by a phase-shift sequence, where n=1, 2, . . . , N, and N is an integer greater than 0.

The transceiver 1040 is configured to send the frame.

It should be noted that a payload part of a data block includes 448 symbols, and a guard interval of the data block includes 64 symbols. A structure of the frame is described in detail in Embodiment 1, and details are not described again.

In embodiments, a phase-shift coefficient of the phase-shift sequence includes at least the following implementations.

Implementation 1: The phase-shift coefficient of the phase-shift sequence is stipulated in a standard, and the phase-shift coefficient includes: 90°, 180°, or 270°.

Implementation 2: A signaling part of the frame generated by the baseband processor includes a phase field, and the phase field includes 1 bit. When the phase field is a first value, the phase-shift coefficient of the phase-shift sequence is 0°; or when the phase field is a second value, the phase-shift coefficient of the phase-shift sequence is 180°.

Implementation 3: A signaling part of the frame generated by the baseband processor includes a phase field, and the phase field includes at least 2 bits. When the phase field is a first value, the phase-shift coefficient of the phase-shift sequence is 0°; when the phase field is a second value, the phase-shift coefficient of the phase-shift sequence is 90°; when the phase field is a third value, the phase-shift coefficient of the phase-shift sequence is 180°; or when the phase field is a fourth value, the phase-shift coefficient of the phase-shift sequence is 270°.

It should be noted that the foregoing implementations of the phase-shift coefficient are described in Embodiment 1, and details are not described again. In addition, the single carrier-based data transmission apparatus may also perform steps 201a to 201f in Embodiment 1.

Optionally, before the baseband processor generates the frame, the transceiver is further configured to receive channel feedback information, where the channel feedback information includes the phase-shift coefficient. The apparatus obtains the phase-shift coefficient from the channel feedback information, and then determines a value to be assigned to a phase field of a header part in the to-be-sent frame. It should be noted that the action of receiving the channel feedback information by the transceiver is applicable to Implementations 2 and 3 of the phase-shift sequence.

Optionally, in another embodiment, the foregoing apparatus 1000 may also function as a receiver in single carrier-based data transmission.

The transceiver 1040 is configured to receive a frame, where a data part of the frame includes 2N data blocks, the 2N data blocks are arranged in a sequence from a first data block to a $2N^{th}$ data block, each data block includes a payload part and a guard interval (GI), payload parts of different data blocks are separated by GIs, and a payload part of a $2n^{th}$ data block is obtained by multiplying a payload part of a $(2n-1)^{th}$ data block by a phase-shift sequence, where n=1, 2, ..., N, and N is an integer greater than 0.

The baseband processor 1030 is configured to parse the frame to obtain the payload part of each data block of the frame, and combine payload parts of the $(2n-1)^{th}$ data block and the $2n^{th}$ data block, where n=1, 2, ..., N, and N is an integer greater than 0.

It should be noted that the action of combining the payload parts of the $(2n-1)^{th}$ data block and the $2n^{th}$ data block is described in detail in Embodiment 1, and details are not described again.

This embodiment of this application provides a single carrier-based data transmission apparatus. The frame generated by the baseband processor of the data transmission apparatus is sent by the transceiver. The data part of the frame includes 2N data blocks, the 2N data blocks are arranged in a sequence from a first data block to a $2N^{th}$ data block, each data block includes a payload part and a guard interval (GI), the payload parts of the different data blocks are separated using the GIs, and a payload part of a $2n^{th}$ data block is obtained by multiplying a payload part of a $(2n-1)^{th}$ data block by the phase-shift sequence, where n=1, 2, ..., N, and N is an integer greater than 0. By using the foregoing manner, data transmission robustness can be improved and data transmission for a longer distance can be supported.

Embodiment 4

Figure 14:
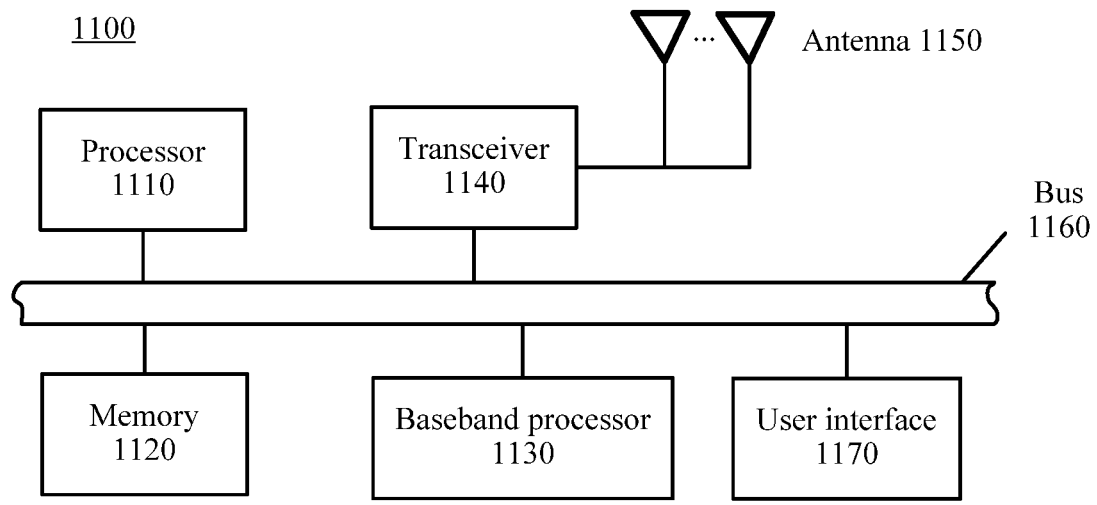
FIG. 14 is a physical structural diagram of an apparatus according to Embodiment 4 of this application.

Embodiment 4 of this application provides a schematic block diagram of a single carrier-based data transmission apparatus. As shown in FIG. 14, the apparatus is, for example, an access point, a station, a base station, or user equipment. Alternatively, the apparatus may be an application-specific integrated circuit (ASIC) or a chip for implementing a related function. The apparatus 1100 includes a processor 1110, a memory 1120, a baseband processor 1130, a transceiver 1140, an antenna 1150, a bus 1160, and a user interface 1170. The apparatus may be the AP and the STA shown in FIG. 1 or the base station and the UE shown in FIG. 2. The components of the apparatus 1100 are described in detail in Embodiment 3, and details are not described again.

The baseband processor 1130 is configured to generate a frame, where a data part of the frame includes a plurality of data blocks, each data block includes a payload part and a guard interval (GI), payload parts of different data blocks are separated by GIs, a first signal and a reversed first signal form a matrix, and the matrix is multiplied by a matrix Q to obtain the payload part of the data block.

The transceiver 1140 is configured to send the frame.

It should be noted that the first signal is a to-be-transmitted data sequence.

In an embodiment, when BPSK modulation is performed on the first signal, the matrix Q is:

$$Q = \begin{bmatrix} a & b \\ c & d \end{bmatrix} = \frac{1}{\sqrt{2}} \begin{bmatrix} 1 & j \\ j & 1 \end{bmatrix} \text{ or } Q = \begin{bmatrix} a & b \\ c & d \end{bmatrix} = \frac{1}{\sqrt{2}} \begin{bmatrix} 1 & j \\ -j & 1 \end{bmatrix}.$$

In an embodiment, when 16 QAM modulation is performed on the first signal, the matrix Q is:

$$Q = \begin{bmatrix} a & b \\ c & d \end{bmatrix} = \frac{1}{\sqrt{5}} \begin{bmatrix} 1 & 2 \\ -2 & 1 \end{bmatrix}.$$

Optionally, in another embodiment, the foregoing apparatus 1100 may also function as a receiver in single carrier-based data transmission.

The transceiver 1130 is configured to receive a frame, where a data part of the frame includes a plurality of data blocks, each data block includes a payload part and a guard interval (GI), payload parts of different data blocks are separated by GIs, a first signal and a reversed first signal form a matrix, and the matrix is multiplied by a matrix Q to obtain the payload part of the data block.

The baseband processor 1140 is configured to parse the frame, form a matrix using the payload part of the data block and a payload part of a reversed data block, and multiply the matrix by an inverse matrix of the matrix Q.

It should be noted that an embodiment of a specific process of parsing the frame is described in detail in Embodiment 2, and details are not described again.

In summary, this application provides a single carrier-based data transmission apparatus. The apparatus is configured to generate a frame and send the frame. The data part of the frame includes a plurality of data blocks. The data block includes a payload part and a guard interval (GI). The payload parts of the different data blocks are separated using the GIs. The first signal and the reversed first signal form the matrix, and the matrix is multiplied by the matrix Q to obtain the payload part of the data block. By using the foregoing manner, data transmission robustness can be improved and data transmission for a longer distance can be supported.

Embodiment 5

Embodiment 5 of this application provides a single carrier-based data transmission method. The method may be applied to an access point and a station, for example, an AP, a STA1, and a STA2 in FIG. 1 and a base station, UE1, and UE2 in FIG. 2. Embodiments of steps of the data transmission method are as follows:

Step 501: Generate a frame, where a data part of the frame includes N data blocks, the N data blocks are arranged in a sequence from a first data block to a $N^{th}$ data block, each data block includes a payload part and a guard interval (GI), payload parts of different data blocks are separated by GIs, and the payload parts of the N data blocks are formed by combining each first data sequence in a first data sequence set and each second data sequence in a second data sequence set. Each first data sequence in the first data sequence set is obtained by modulating a low-density parity-check (LDPC) code block, each second data sequence in the second data sequence set is obtained by scrambling and modulating the LDPC code block, and N is an integer greater than 0.

Step 502: Send the frame.

In an embodiment, the data transmission method is applied to a wireless communications system operating at a high frequency. The high frequency includes a frequency band of 6 GHz or higher. Preferably, the data transmission method may be applied to a 28 GHz frequency band or a 60 GHz frequency band.

It should be noted that an LDPC code block s(k) uses 448 symbols, 672 symbols, or 1344 symbols as a unit. A length of the payload part is 448 symbols, and a length of the guard interval (GI) is 64 symbols.

Figure 15:
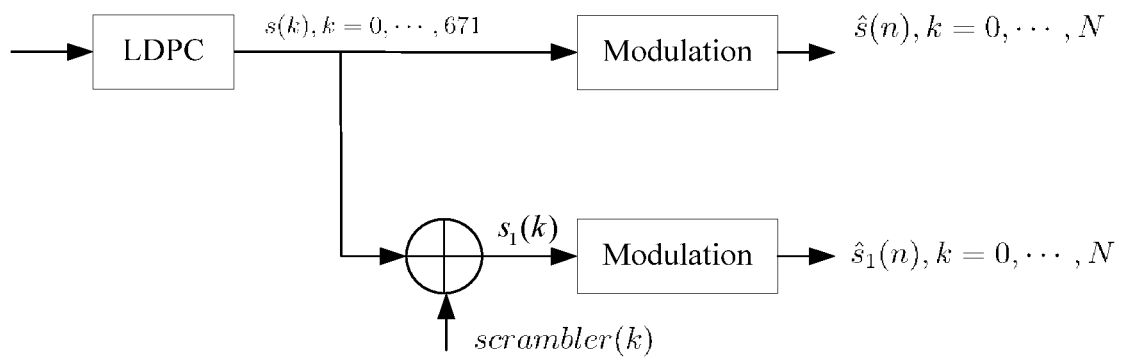
FIG. 15 is a block diagram of signal processing according to Embodiment 5 of this application.

It should be noted that a manner for generating the foregoing first data sequence set and second data sequence set is shown in FIG. 15. Generation of each first data sequence in the first data sequence set includes modulation, and generation of each second data sequence in the second data sequence set includes scrambling and modulation. The first data sequences and the second data sequences are the same in modulation scheme and length.

The following uses an example in which a length of the LDPC code block is 672 symbols for description. Details are shown in FIG. 16.

When the modulation scheme is BPSK, sequence lengths of $\hat{s}(n)$ and $\hat{s}_1(n)$ are 672 symbols. A payload part of the first data block of the frame and a payload part of the first half of the second data block carry $\hat{s}(n)$, and a payload part of the second half of the second data block and a payload part of the third data block carry $\hat{s}_1(n)$. By analogy, when to-be-transmitted data includes a plurality of LDPC code blocks, the first data sequence set is located at a payload part of the $(3i+1)^{th}$ data block and a payload part of the first half of the $(3i+2)^{th}$ data block, and the second data sequence set is located at a payload part of the second half of the $(3i+2)^{th}$ data block and a payload part of the $(3i+3)^{th}$ data block, where i=0, 1, . . . , n.

When the modulation scheme is QPSK, sequence lengths of $\hat{s}(n)$ and $\hat{s}_1(n)$ are 336 symbols. The $1^{st}$ to $336^{th}$ symbols of the payload part of the first data block carry $\hat{s}(n)$, and the $337^{th}$ to $448^{th}$ symbols of the payload part of the first data block and the $1^{st}$ to $224^{th}$ symbols of a payload part of the second data block carry $\hat{s}_1(n)$. By analogy, when to-be-transmitted data includes a plurality of LDPC code blocks, each first data sequence in the first data sequence set and each second data sequence in the second data sequence set form, in pairs, a combined sequence with a length of 672 symbols; and the combined sequence is padded to the payload parts of the N data blocks.

When the modulation scheme is 16 QAM, sequence lengths of $\hat{s}(n)$ and $\hat{s}_1(n)$ are 168 symbols. The $1^{st}$ to $168^{th}$ symbols of the payload part of the first data block carry $\hat{s}(n)$, and the $169^{th}$ to $336^{th}$ symbols of the payload part of the first data block carry $\hat{s}_1(n)$. By analogy, when to-be-transmitted data includes a plurality of LDPC code blocks, each first data sequence in the first data sequence set and each second data sequence in the second data sequence set form, in pairs, a combined sequence with a length of 336 symbols; and the combined sequence is padded to the payload parts of the N data blocks.

When the modulation scheme is 64 QAM, sequence lengths of $\hat{s}(n)$ and $\hat{s}_1(n)$ are 112 symbols. The $1^{st}$ to $112^{th}$ symbols of the payload part of the first data block carry $\hat{s}(n)$, and the $113^{th}$ to $224^{th}$ symbols of the payload part of the first data block carry $\hat{s}_1(n)$. By analogy, when to-be-transmitted data includes a plurality of LDPC code blocks, each first data sequence in the first data sequence set and each second data sequence in the second data sequence set form, in pairs, a combined sequence with a length of 224 symbols; and the combined sequence is padded to the payload parts of the N data blocks.

In summary, this application provides a single carrier-based data transmission method. The data transmission method includes: generating the frame and sending the frame. The data part of the frame includes N data blocks, each data block includes a payload part and a guard interval (GI), the payload parts of the different data blocks are separated using the GIs, and the payload parts of the N data blocks are formed by combining each first data sequence in the first data sequence set and each second data sequence in the second data sequence set. Each first data sequence is obtained by modulating a low-density parity-check LDPC code block, each second data sequence in the second data sequence set is obtained by scrambling and modulating the LDPC code block, and N is an integer greater than 0. By using the foregoing manner, the data transmission method can be used to improve data transmission robustness and support data transmission for a longer distance.

In addition, in the single carrier-based data transmission method, actions of a receiver include at least the following implementations:

Step 1: Receive a frame sent by a transmit end. A data part of the frame includes N data blocks, the N data blocks are arranged in a sequence from a first data block to a $N^{th}$ data blocks, each data block includes a payload part and a guard interval (GI), payload parts of different data blocks are separated by GIs, and the payload parts of the N data blocks are formed by combining each first data sequence in a first data sequence set and each second data sequence in a second data sequence set. Each first data sequence is obtained by modulating a low-density parity-check LDPC code block, each second data sequence in the second data sequence set is obtained by scrambling and modulating the LDPC code block, and N is an integer greater than 0.

Step 2: Parse the frame; divide the payload parts of the N data blocks into blocks, where a size of each block is related to a modulation scheme; demodulate symbols of the first half of each block; demodulate and descramble symbols of the second half of each block; and combine demodulated symbols of the first half of each block and the demodulated and descrambled symbols of the second half of each block.

It should be noted that a length of the payload part is 448 symbols, and a length of the guard interval (GI) is 64 symbols. The first data sequences and the second data sequences are the same in modulation scheme. When the modulation scheme is BPSK, the size of each block is 1344 symbols. When the modulation scheme is QPSK, the size of each block is 672 symbols. When the modulation scheme is 16 QAM, the size of each block is 336 symbols. When the modulation scheme is 64 QAM, the size of each block is 224 symbols.

In summary, this application provides a single carrier-based data transmission method. The data transmission method includes: receiving the frame and parsing frame. The data part of the frame includes N data blocks, the data block includes a payload part and a guard interval (GI), and the payload parts of the different data blocks are separated using the GIs. The payload parts of the N data blocks are divided into blocks, where a size of each block is related to a modulation scheme; the symbols of the first half of each block are demodulated; the symbols of the second half of each block are demodulated and descrambled; and the demodulated symbols of the first half of each block and the demodulated and descrambled symbols of the second half of each block are combined. By using the foregoing manner, the data transmission method can be used to improve data transmission robustness and support data transmission for a longer distance.

Optionally, in another data transmission method, the data transmission method includes the following steps:

Step 1: Generate a frame, where a data part of the frame includes 2N data blocks, the 2N data blocks are arranged in a sequence from a first data block to a $2N^{th}$ data block, each data block includes a payload part and a guard interval (GI), payload parts of different data blocks are separated by GIs, and a payload part of a $2n^{th}$ data block is obtained by multiplying a payload part of a $(2n-1)^{th}$ data block by a scrambling sequence, where n=1, 2, . . . , N, and N is an integer greater than 0.

Step 2: Send the frame.

It should be noted that a length of the payload part is 448 symbols, a length of the GI is 64 symbols, and a length of the scrambling sequence is 448 symbols. The symbols of the payload part may be BPSK-, QPSK-, 16 QAM-, or 64 QAM-modulated symbols.

It should be noted that a value range of the scrambling sequence is (−1, +1).

In summary, this application provides a single carrier-based data transmission method. The data transmission method includes: generating the frame and sending the frame. The data part of the frame includes 2N data blocks, the 2N data blocks are arranged in a sequence from a first data block to a $2N^{th}$ data block, each data block includes a payload part and a guard interval (GI), the payload parts of the different data blocks are separated using the GIs, and the payload part of a $2n^{th}$ data block is obtained by multiplying the payload part of a $(2n-1)^{th}$ data block by the scrambling sequence. By using the foregoing manner, the data transmission method can be used to improve data transmission robustness and support data transmission for a longer distance.

Embodiment 6

Embodiment 6 of this application provides a single carrier-based data transmission method. The method may be applied to an access point and a station, for example, an AP, a STA1, and a STA2 in FIG. 1 and a base station, UE1, and UE2 in FIG. 2. Embodiments of steps of the data transmission method are as follows:

Step 601: Generate a frame, where a data part of the frame includes N data blocks, the N data blocks are arranged in a sequence from a first data block to a $N^{th}$ data blocks, each data block includes a payload part and a guard interval (GI), payload parts of different data blocks are separated by GIs, and the payload parts of the N data blocks are formed by combining each first data sequence in a first data sequence set and each second data sequence in a second data sequence set. Each first data sequence is obtained by modulating a low-density parity-check LDPC code block, each second data sequence in the second data sequence set is obtained by interleaving and modulating the LDPC code block, and N is an integer greater than 0.

Step 602: Send the frame.

In an embodiment, the data transmission method is applied to a wireless communications system operating at a high frequency. The high frequency includes a frequency band of 6 GHz or higher. Preferably, the data transmission method may be applied to a 28 GHz frequency band or a 60 GHz frequency band.

Figure 17:
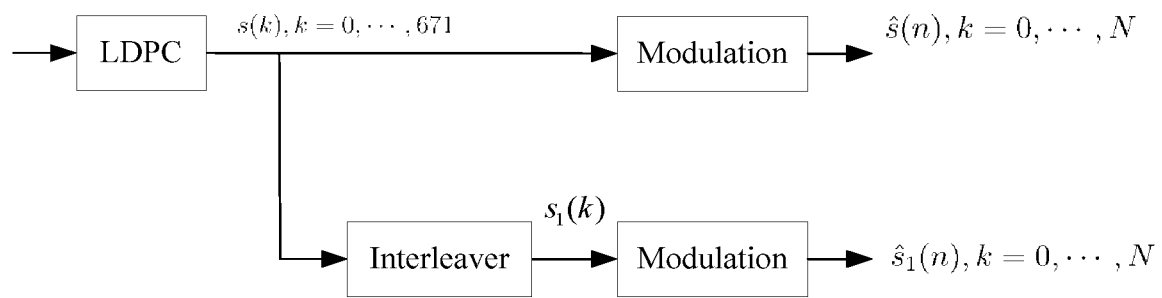
FIG. 17 is a block diagram of signal processing according to Embodiment 6 of this application.

It should be noted that a manner for generating the foregoing first data sequence set and second data sequence set is shown in FIG. 17. Generation of each first data sequence in the first data sequence set includes modulation, and generation of each second data sequence in the second data sequence set includes interleaving and modulation. The first data sequences and the second data sequences are the same in modulation scheme.

The following uses an example in which a length of the LDPC code block is 672 symbols for description. Details are shown in FIG. 18.

When the modulation scheme is BPSK, sequence lengths of $\hat{s}(n)$ and $\hat{s}_1(n)$ are 672 symbols. A payload part of the first data block of the frame and a payload part of the first half of the second data block carry $\hat{s}(n)$, and a payload part of the second half of the second data block and a payload part of the third data block carry $\hat{s}_1(n)$. By analogy, when to-be-transmitted data includes a plurality of LDPC code blocks, the first data sequence set is located at a payload part of the $(3i+1)^{th}$ data block and a payload part of the first half of the $(3i+2)^{th}$ data block, and the second data sequence set is located at a payload part of the second half of the $(3i+2)^{th}$ data block and a payload part of the $(3i+3)^{th}$ data block, where i=0, 1, . . . , n.

When the modulation scheme is QPSK, sequence lengths of $\hat{s}(n)$ and $\hat{s}_1(n)$ are 336 symbols. The $1^{st}$ to $336^{th}$ symbols of a payload part of the first data block carry $\hat{s}(n)$, and the $337^{th}$ to $448^{th}$ symbols of the payload part of the first data block and the $1^{st}$ to $224^{th}$ symbols of a payload part of the second data block carry $\hat{s}_1(n)$. By analogy, when to-be-transmitted data includes a plurality of LDPC code blocks, each first data sequence in the first data sequence set and each second data sequence in the second data sequence set form, in pairs, a combined sequence with a length of 672 symbols; and the combined sequence is padded to the payload parts of the N data blocks.

When the modulation scheme is 16 QAM, sequence lengths of $\hat{s}(n)$ and $\hat{s}_1(n)$ are 168 symbols. The $1^{st}$ to $168^{th}$ symbols of a payload part of the first data block carry $\hat{s}(n)$, and the $169^{th}$ to $336^{th}$ symbols of the payload part of the first data block carry $\hat{s}_1(n)$. By analogy, when to-be-transmitted data includes a plurality of LDPC code blocks, each first data sequence in the first data sequence set and each second data sequence in the second data sequence set form, in pairs, a combined sequence with a length of 336 symbols; and the combined sequence is padded to the payload parts of the N data blocks.

When the modulation scheme is 64 QAM, sequence lengths of $\hat{s}(n)$ and $\hat{s}_1(n)$ are 112 symbols. The $1^{st}$ to $112^{th}$ symbols of a payload part of the first data block carry $\hat{s}(n)$, and the $113^{th}$ to $224^{th}$ symbols of the payload part of the first data block carry $\hat{s}_1(n)$. By analogy, when to-be-transmitted data includes a plurality of LDPC code blocks, each first data sequence in the first data sequence set and each second data sequence in the second data sequence set form, in pairs, a combined sequence with a length of 224 symbols; and the combined sequence is padded to the payload parts of the N data blocks.

It should be noted that an interleaving operation includes at least the following two manners:

Manner 1: Reversing processing, in which an input is $x(k)$, k=0, 1, . . . , K−1, and an output is k'=−k+K−1.

To be specific, if an input signal is x(0), x(1), . . . , x(671), an output signal is x(671), x(672), . . . , x(1), x(0).

Manner 2: Row-column interleaving. An embodiment of an implementation is as follows:

An input is x(k), k=0, 1, . . . , K−1 and is divided into two parts, which are respectively $x_1(k)$=x(k), k=0, . . . , K/2−1 and $x_2(k)$=x(k+K/2), k=0, . . . , K/2−1.

An output is y(k), where y(2k)=$x_1(k)$, k=0, . . . , K/2−1, and y(2k+1)=$x_2(k)$, k=0, . . . , K/2−1.

Figure 19:
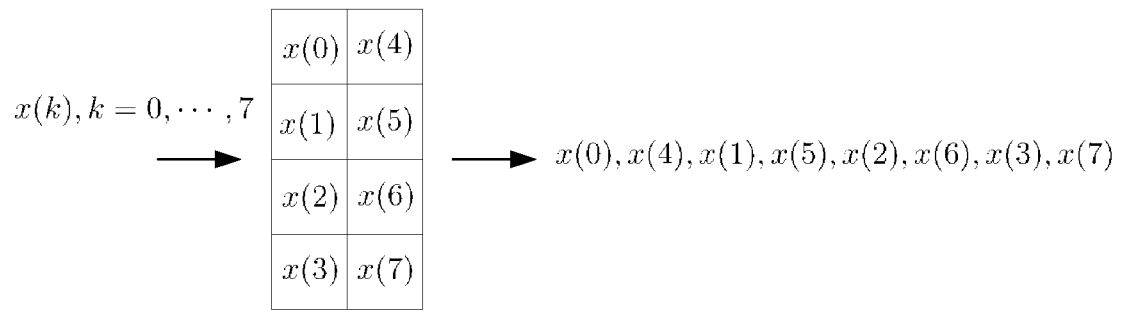
FIG. 19 is a schematic diagram of bit interleaving according to Embodiment 6 of this application.

An embodiment of a specific operation is shown in FIG. 19. K=8 is used as an example in the figure.

In summary, this application provides a single carrier-based data transmission method. The data transmission method includes: generating the frame and sending the frame. The data part of the frame includes N data blocks, the data block includes a payload part and a guard interval (GI), the payload parts of the different data blocks are separated using the GIs, and the payload parts of the N data blocks are formed by combining each first data sequence in the first data sequence set and each second data sequence in the second data sequence set. Each first data sequence is obtained by modulating a low-density parity-check LDPC code block, each second data sequence in the second data sequence set is obtained by interleaving and modulating the LDPC code block, and N is an integer greater than 0. By using the foregoing manner, the data transmission method can be used to improve data transmission robustness and support data transmission for a longer distance.

In addition, in the single carrier-based data transmission method, actions of a receiver include at least the following implementations:

Step 1: Receive a frame sent by a transmit end. A data part of the frame includes N data blocks, the N data blocks are arranged in a sequence from a first data block to a $N^{th}$ data blocks, each data block includes a payload part and a guard interval (GI), payload parts of different data blocks are separated by GIs, and the payload parts of the N data blocks are formed by combining each first data sequence in a first data sequence set and each second data sequence in a second data sequence set. Each first data sequence is obtained by modulating a low-density parity-check LDPC code block, each second data sequence in the second data sequence set is obtained by interleaving and modulating the LDPC code block, and N is an integer greater than 0.

Step 2: Parse the frame; divide the payload parts of the N data blocks into blocks, where a size of each block is related to a modulation scheme; demodulate symbols of the first half of each block; demodulate and de-interleave symbols of the second half of each block, and combine demodulated symbols of the first half of each block and the demodulated and de-interleaved symbols of the second half of each block.

It should be noted that a length of the payload part is 448 symbols, and a length of the guard interval (GI) is 64 symbols. The first data sequences and the second data sequences are the same in modulation scheme and length. When the modulation scheme is BPSK, the size of each block is 1344 symbols. When the modulation scheme is QPSK, the size of each block is 672 symbols. When the modulation scheme is 16 QAM, the size of each block is 336 symbols. When the modulation scheme is 64 QAM, the size of each block is 224 symbols.

In summary, this application provides a single carrier-based data transmission method. The data transmission method includes: receiving the frame and parsing the frame. The data part of the frame includes N data blocks, the data block includes a payload part and a guard interval (GI), and the payload parts of the different data blocks are separated using the GIs. The payload parts of the N data blocks are divided into blocks, where a size of each block is related to a modulation scheme; the symbols of the first half of each block are demodulated; the symbols of the second half of each block are demodulated and de-interleaved; and the demodulated symbols of the first half of each block and the demodulated and de-interleaved symbols of the second half of each block are combined. By using the foregoing manner, the data transmission method can be used to improve data transmission robustness and support data transmission for a longer distance.

Optionally, in another data transmission method, the data transmission method includes the following steps:

Step 1: Generate a frame, where a data part of the frame includes N data blocks, the N data blocks are arranged in a sequence from a first data block to a $N^{th}$ data block, and the N data blocks are processed through interleaving.

Step 2: Send the frame.

Figure 20:
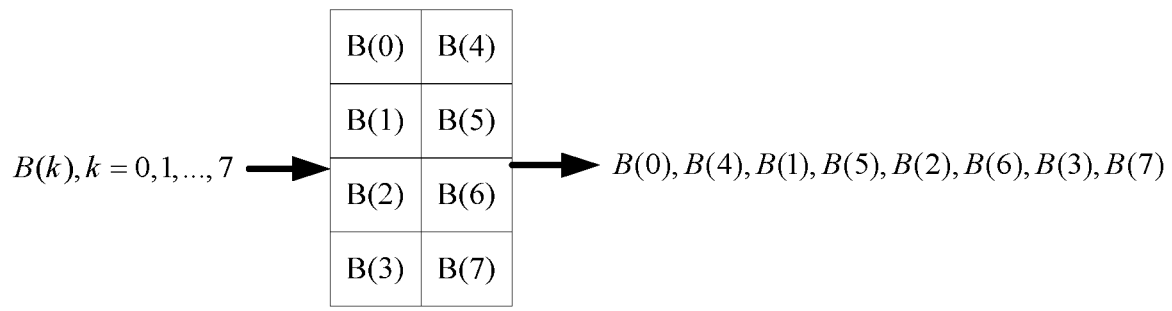
FIG. 20 is a schematic diagram of symbol interleaving according to Embodiment 6 of this application.

It should be noted that eight data blocks are used as an example in FIG. 20 to describe an interleaving operation.

In the foregoing data transmission method, the N data blocks can be de-interleaved on a receiver to obtain data.

In summary, this application provides a data transmission method. The data transmission method includes: generating the frame and sending the frame, where the data part of the frame includes N data blocks, the N data blocks are arranged in a sequence from a first data block to a $N^{th}$ data block, and the N data blocks are processed through interleaving. By using the foregoing manner, the data transmission method can be used to improve data transmission robustness and support data transmission for a longer distance.

Embodiment 7

Embodiment 7 of this application provides a single carrier-based data transmission method. The method may be applied to an access point and a station, for example, an AP, a STA1, and a STA2 in FIG. 1 and a base station, UE1, and UE2 in FIG. 2. An embodiment of steps of the data transmission method are as follows:

Step 701: Generate a frame, where a data part of the frame includes 2N data blocks, the 2N data blocks are arranged in a sequence from a first data block to a $2N^{th}$ data block, each data block includes a payload part and a guard interval (GI), payload parts of different data blocks are separated by GIs, and a value of a payload part of the $2n^{th}$ data block is obtained by performing a conjugate operation on a value of a payload part of the $(2n-1)^{th}$ data block, where n=1, 2, . . . , N, and N is an integer greater than 0.

Step 702: Send the frame.

In an embodiment, the data transmission method is applied to a wireless communications system operating at a high frequency. The high frequency includes a frequency band of 6 GHz or higher. Preferably, the data transmission method may be applied to a 28 GHz frequency band or a 60 GHz frequency band.

Figure 21:
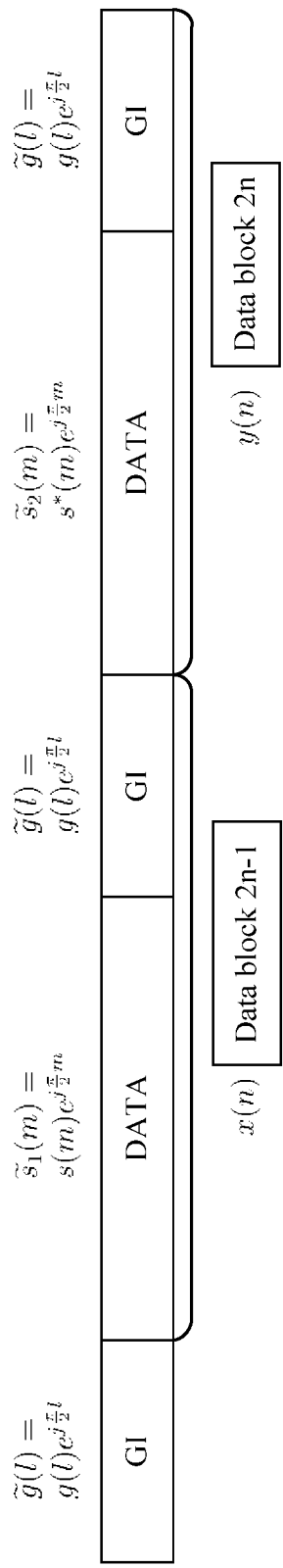
FIG. 21 is a diagram 1 of signal processing according to Embodiment 7 of this application.
Figure 22:
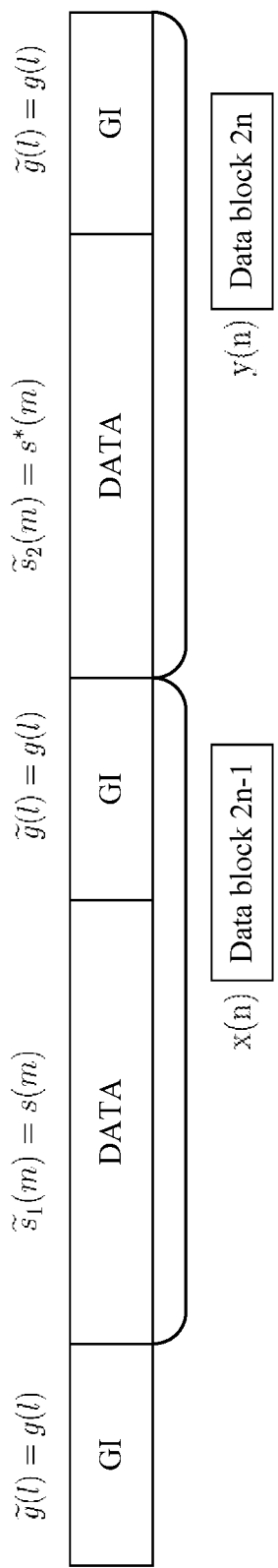
FIG. 22 is a diagram 2 of signal processing according to Embodiment 7 of this application.

It should be noted that structures of the $(2n-1)^{th}$ data block and the $2n^{th}$ data block are shown in FIG. 21 and FIG. 22. In FIG. 21, a π/2 phase-shift operation is performed on a guard interval part and a payload part of a data block. In FIG. 22, no phase-shift operation is performed on a guard interval part and a payload part of a data block.

In an embodiment, in FIG. 21 and FIG. 22, a data block modulation scheme includes BPSK, QPSK, 16 QAM, 16 APSK, or 64 QAM.

The following describes sending and receiving processes in single carrier data transmission with reference to FIG. 21 and FIG. 22.

In FIG. 21, a single-carrier signal sent by a transmitter includes the following parts:

When a transmit-end device uses a short guard interval (GI), M=480, G=32, and N=512. When the transmit-end device uses a regular GI, M=448, G=64, and N=512. When the transmit-end device uses a long GI, M=384, G=128, and N=512.

Guard interval (GI) part:

$$\tilde{g}(l) = g(l)e^{j\frac{\pi}{2}l},$$

where l=0, 1, . . . , G−1, and

Payload part:

$$\tilde{s}(m) = s(m)e^{j\frac{\pi}{2}m},$$

where m=0, 1, . . . , M−1.

A signal sent on the $(2n-1)^{th}$ data block is x(n), where n=0, 1, . . . , N−1, N=M+G, and $$x(n) = \begin{cases} s(n)e^{j\frac{\pi}{2}n}, & n = 0, 1, \ldots, M-1 \\ g(n-M)e^{j\frac{\pi}{2}(n-M)}, & n = M, \ldots, N-1 \end{cases}.$$

A signal sent on the $2n^{th}$ data block is y(n), where n=0, 1, . . . , N−1, N=M+G, and $$y(n) = \begin{cases} s^*(n)e^{j\frac{\pi}{2}n}, & n = 0, 1, \ldots, M-1 \\ g(n-M)e^{j\frac{\pi}{2}(n-M)}, & n = M, \ldots, N-1 \end{cases},$$

where (·)* represents a conjugate operation.

In an embodiment, in FIG. 21, processing of receiving the single-carrier signal sent by the transmitter is as follows:

Frequency-domain signals $r_{f1}(k)$ and $r_{f2}(k)$ that are transmitted through a channel and that are received by a receiver are in the following form:

$$\begin{cases} r_{f1}(k) = h_f(k)x_f(k) \\ r_{f2}(k) = h_f(k)y_f(k) \end{cases},$$

where $h_f(k)$ is a channel response corresponding to a subcarrier k;

$x_f(k)$=FFT{x(n)} is a frequency-domain signal corresponding to x(n);

$y_f(k)$=FFT{y(n)} is a frequency-domain signal corresponding to y(n);

and k is a sequence number of a subcarrier.

It can be easily verified that $$y_f(k) = \begin{cases} x_f^*\left(\frac{N}{2}-k\right), & k = 0, \ldots, \frac{N}{2} \\ x_f^*\left(\frac{3N}{2}-k\right), & k = \frac{N}{2}+1, \ldots, N-1 \end{cases}.$$

Therefore, the signals are combined in the following manners:

When k=0, . . . , N/2, $$\begin{cases} r_{f1}(k) = h_f(k)x_f(k) \\ r_{f2}\left(\frac{N}{2}-k\right) = h_f\left(\frac{N}{2}-k\right)x_f^*(k) \end{cases},$$

and
$r_{f1}(k)$ and $$r_{f2}\left(\frac{N}{2}-k\right)$$

are combined to obtain:

$$r_f(k) = \frac{h_f^*(k) \times r_{f1}(k) + h_f\left(\frac{N}{2}-k\right) \times r_{f2}^*\left(\frac{N}{2}-k\right)}{|h_f(k)|^2 + \left|h_f\left(\frac{N}{2}-k\right)\right|^2}$$

$$= x_f(k).$$

When k=N/2+1, . . . , N−1, $$\begin{cases} r_{f1}(k) = h_f(k)x_f(k) \\ r_{f2}\left(\frac{3N}{2}-k\right) = h_f\left(\frac{3N}{2}-k\right)x_f^*(k) \end{cases},$$

and
$r_{f1}(k)$ and $$r_{f2}\left(\frac{3N}{2}-k\right)$$

are combined to obtain:

$$r_f(k) = \frac{h_f^*(k) \times r_{f1}(k) + h_f\left(\frac{3N}{2}-k\right) \times r_{f2}^*\left(\frac{3N}{2}-k\right)}{|h_f(k)|^2 + \left|h_f\left(\frac{3N}{2}-k\right)\right|^2}$$

$$= x_f(k).$$

$r_f(k)$ is obtained, where k=0, 1, . . . , N−1; and IFFT is performed on $r_f(k)$, to obtain x(n).

In FIG. 22, a single-carrier signal sent by a transmitter includes the following parts:

When a transmit-end device uses a short guard interval (GI), M=480, G=32, and N=512. When the transmit-end device uses a regular GI, M=448, G=64, and N=512. When the transmit-end device uses a long GI, M=384, G=128, and N=512.

Guard interval part: $\tilde{g}(l)=g(l)$, where $l=0, 1, \ldots, G-1$, and

Payload part: $\tilde{s}(m)=s(m)$, where $m=0, 1, \ldots, M-1$.

A signal sent on the $(2n-1)^{th}$ data block is $x(n)$, where $n=0, 1, \ldots, N-1$, $N=M+G$, and $$x(n) = \begin{cases} s(n), & n = 0, 1, \ldots, M-1 \\ g(n-M), & n = M, \ldots, N-1 \end{cases}.$$

A signal sent on the $2n^{th}$ data block is $y(n)$, where $n=0, 1, \ldots, N-1$, $N=M+G$, and $$y(n) = \begin{cases} s^*(n), & n = 0, 1, \ldots, M-1 \\ g(n-M), & n = M, \ldots, N-1 \end{cases},$$

where $(\cdot)^*$ represents a conjugate operation.

In an embodiment, in FIG. 22, processing of receiving the single-carrier signal sent by the transmitter is as follows:

Frequency-domain signals $r_{f1}(k)$ and $r_{f2}(k)$ that are transmitted through a channel and that are received by a receiver are in the following form:

$$\begin{cases} r_{f1}(k) = h_f(k)x_f(k) \\ r_{f2}(k) = h_f(k)y_f(k) \end{cases}.$$

It can be easily verified that $$y_f(k) = \begin{cases} x_f^*(k), & k = 0 \\ x_f^*(N-k), & k = 1, \ldots, N-1 \end{cases}.$$

Therefore, the signals are combined in the following manners:

When $k=0$, $$\begin{cases} r_{f1}(0) = h_f(0)x_f(0) \\ r_{f2}(0) = h_f(0)x_f^*(0) \end{cases},$$

and $r_{f1}(0)$ and $r_{f2}(0)$ are combined to obtain:

$$r_f(0) = \frac{h_f^*(0) \times r_{f1}(0) + h_f(0) \times r_{f2}^*(0)}{|h_f(0)|^2 + |h_f(0)|^2}$$
$$= x_f(0)$$

When $k=1, \ldots, N-1$, $$\begin{cases} r_{f1}(k) = h_f(k)x_f(k) \\ r_{f2}(N-k) = h_f(N-k)x_f^*(k) \end{cases},$$

and $r_{f1}(k)$ and $r_{f2}(N-k)$ are combined to obtain:

$$r_f(k) = \frac{h_f^*(k) \times r_{f1}(k) + h_f(N-k) \times r_{f2}^*(N-k)}{|h_f(k)|^2 + |h_f(N-k)|^2}$$
$$= x_f(k).$$

$r_f(k)$ is obtained, where $k=0, 1, \ldots, N-1$; and IFFT is performed on $x(n)$, to obtain $r_f(k)$.

In summary, this application provides a single carrier-based data transmission method. The data transmission method includes: generating the frame and sending the frame. The data part of the frame includes 2N data blocks, the 2N data blocks are arranged in a sequence from a first data block to a $2N^{th}$ data block, each data block includes a payload part and a guard interval (GI), the payload parts of the different data blocks are separated using the GIs, and the value of the payload part of a $2n^{th}$ data block is obtained by performing a conjugate operation on the value of the payload part of a $(2n-1)^{th}$ data block, where $n=1, 2, \ldots, N$, and N is an integer greater than 0. By using the foregoing manner, data transmission robustness can be improved and data transmission for a longer distance can be supported.

Embodiment 8

Embodiment 8 of this application provides a single carrier-based data transmission method. The method may be applied to an access point and a station, for example, an AP, a STA1, and a STA2 in FIG. 1 and a base station, UE1, and UE2 in FIG. 2. An embodiment of steps of the data transmission method are as follows:

Step 801: Generate a first radio frame and a second radio frame, where the first radio frame and the second radio frame each include 2N data blocks, the 2N data blocks are arranged in a sequence from a first data block to a $2N^{th}$ data block, each data block includes a payload part and a guard interval (GI), and payload parts of different data blocks are separated by GIs. A value of a payload part of a $(2n-1)^{th}$ data block of the first radio frame includes a first information set, a value of a payload part of a $(2n-1)^{th}$ data block of the second radio frame includes a second information set, a value of a payload part of the $2n^{th}$ data block of the first radio frame includes a conjugate of the second information set, and a value of a payload part of the $2n^{th}$ data block of the second radio frame includes a conjugate of the first information set, where $n=1, 2, \ldots, N$, and N is an integer greater than 0.

Step 802: Send the first radio frame through a first antenna, and send the second radio frame through a second antenna.

In an embodiment, the data transmission method is applied to a wireless communications system operating at a high frequency. The high frequency includes a frequency band of 6 GHz or higher. Preferably, the data transmission method may be applied to a 28 GHz frequency band or a 60 GHz frequency band.

Figure 23:
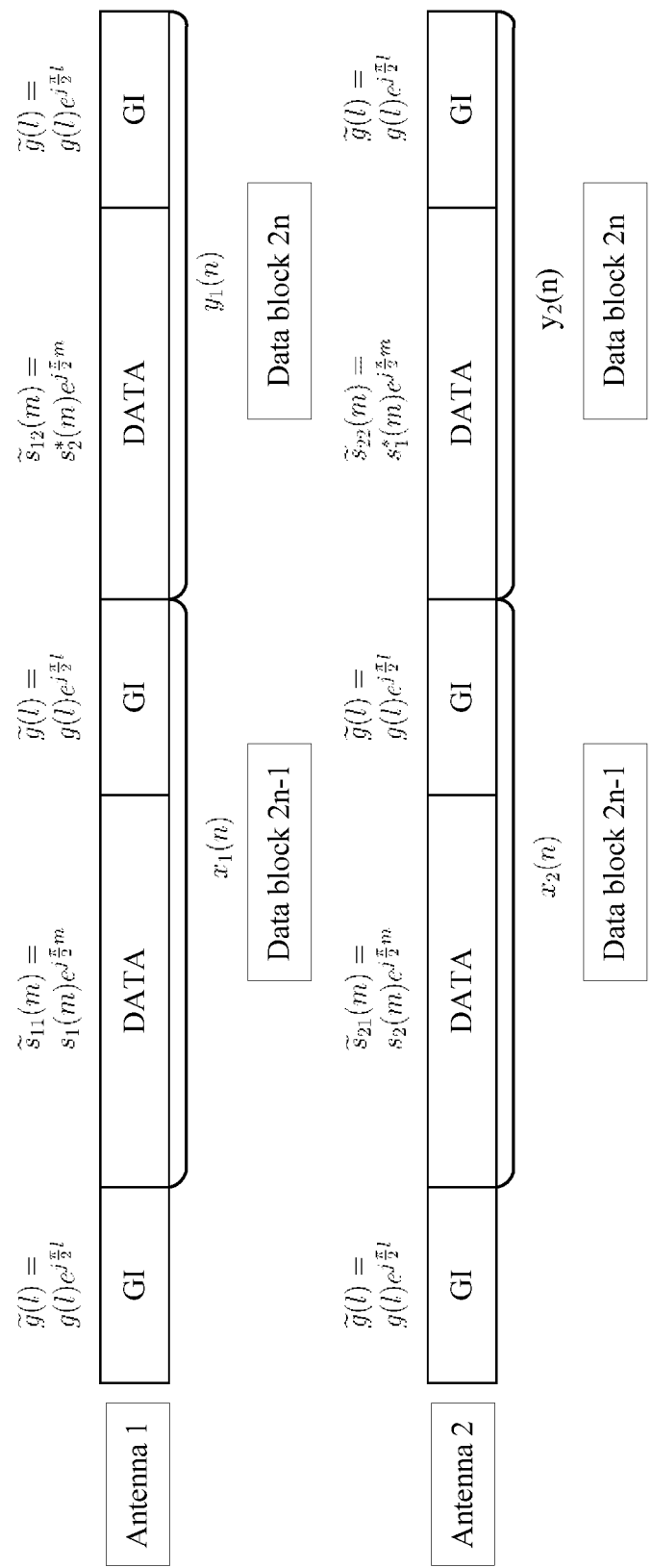
FIG. 23 is a diagram 1 of signal processing according to Embodiment 8 of this application.
Figure 24:
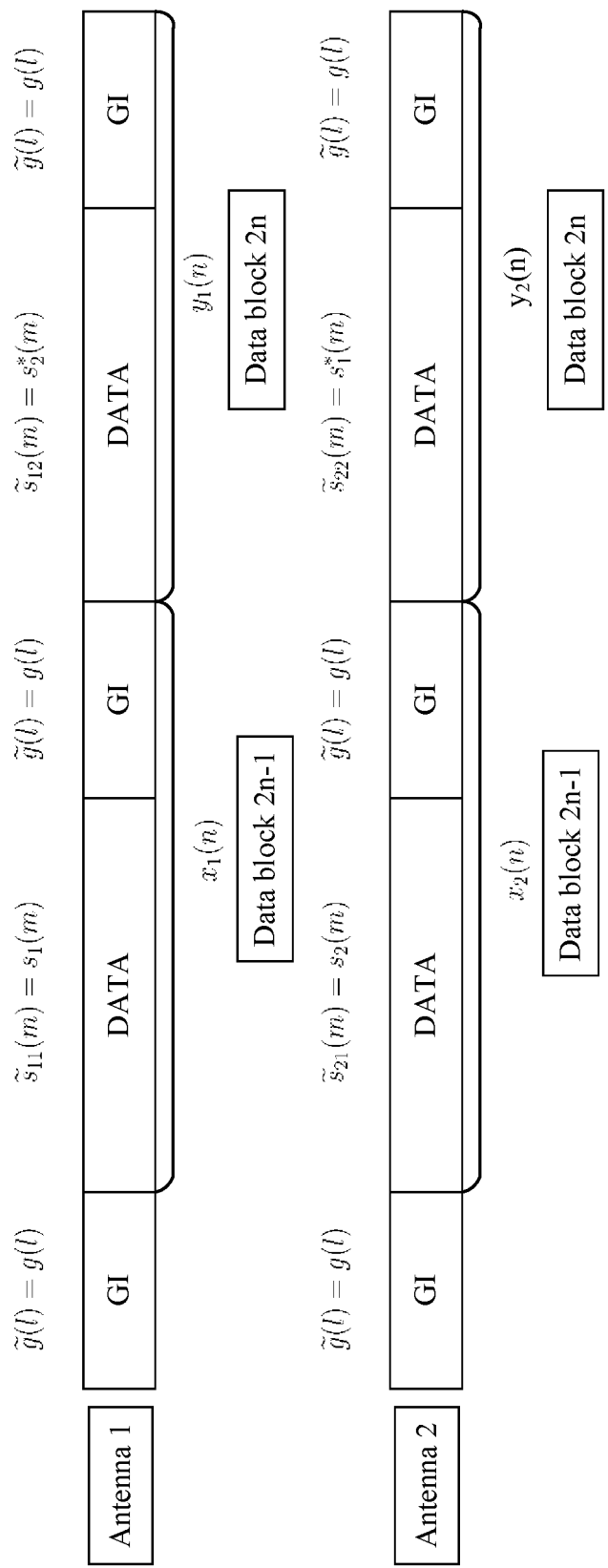
FIG. 24 is a diagram 2 of signal processing according to Embodiment 8 of this application.

It should be noted that structures of the $(2n-1)^{th}$ data block and the $2n^{th}$ data block are shown in FIG. 23 and FIG. 24. In FIG. 23, a π/2 phase-shift operation is performed on a guard interval part and a payload part of a data block. In FIG. 24, no phase-shift operation is performed on a guard interval part and a payload part of a data block.

In an embodiment, in FIG. 23 and FIG. 24, a data block modulation scheme includes BPSK, QPSK, 16 QAM, 16 APSK, or 64 QAM.

The following describes sending and receiving processes in single carrier-based data transmission with reference to FIG. 23 and FIG. 24.

In FIG. 23, a single-carrier signal sent by a transmitter includes the following parts:

When a transmit-end device uses a short guard interval (GI), M=480, G=32, and N=512. When the transmit-end device uses a regular GI, M=448, G=64, and N=512. When the transmit-end device uses a long GI, M=384, G=128, and N=512.

Guard intervals GIs of signals sent on the two antennas are the same and both are $$\tilde{g}(l) = g(l)e^{j\frac{\pi}{2}l},$$

where l=0, 1, . . . , G−1; and $s_1(m)$ and $s_2(m)$ are to-be-sent single-carrier data signals, where $s_1(m)$ is the first information set, and $s_2(m)$ is the second information set.

Data signals sent through the first antenna of the transmitter are as follows:

A signal sent on the $(2n-1)^{th}$ data block is $x_1(n)$, where n=0, 1, . . . , N−1, N=M+G, and $$x_1(n) = \begin{cases} s_1(n)e^{j\frac{\pi}{2}n}, & n = 0, 1, \dots, M-1 \\ g(n-M)e^{j\frac{\pi}{2}(n-M)}, & n = M, \dots, N-1 \end{cases}.$$

A signal sent on the $2n^{th}$ data block is $y_1(n)$, where n=0, 1, . . . , N−1, N=M+G, and $$y_1(n) = \begin{cases} s_2^*(n)e^{j\frac{\pi}{2}n}, & n = 0, 1, \dots, M-1 \\ g(n-M)e^{j\frac{\pi}{2}(n-M)}, & n = M, \dots, N-1 \end{cases}.$$

Data signals sent through the second antenna of the transmitter are as follows:

A signal sent on the $(2n-1)^{th}$ data block is $x_2(n)$, where n=0, 1, . . . , N−1, N=M+G, and $$x_2(n) = \begin{cases} s_2(n)e^{j\frac{\pi}{2}n}, & n = 0, 1, \dots, M-1 \\ g(n-M)e^{j\frac{\pi}{2}(n-M)}, & n = M, \dots, N-1 \end{cases}.$$

A signal sent on the $2n^{th}$ data block is $y_2(n)$, where n=0, 1, . . . , N−1, N=M+G, and $$y_2(n) = \begin{cases} s_1^*(n)e^{j\frac{\pi}{2}n}, & n = 0, 1, \dots, M-1 \\ g(n-M)e^{j\frac{\pi}{2}(n-M)}, & n = M, \dots, N-1 \end{cases}.$$

Frequency-domain signals that are transmitted through a channel and that are received by a receiver may be in the following form:

Signals received on a first block may be represented as follows:

$$\begin{cases} r_{f1}^{[1]}(k) = h_{f,11}(k)x_{f1}(k) + h_{f,12}(k)x_{f2}(k) \\ r_{f2}^{[1]}(k) = h_{f,21}(k)x_{f1}(k) + h_{f,22}(k)x_{f2}(k) \end{cases};$$

and signals received on a second block may be represented as follows:

$$\begin{cases} r_{f1}^{[2]}(k) = h_{f,11}(k)y_{f1}(k) + h_{f,12}(k)y_{f2}(k) \\ r_{f2}^{[2]}(k) = h_{f,21}(k)y_{f1}(k) + h_{f,22}(k)y_{f2}(k) \end{cases},$$

where:

$r_{f1}^{[1]}(k)$ is a signal received through a first antenna of the receiver on the first block of a subcarrier k;

$r_{f2}^{[1]}(k)$ is a signal received through a second antenna of the receiver on the first block of the subcarrier k;

$r_{f1}^{[2]}(k)$ is a signal received through the first antenna of the receiver on the second block of the subcarrier k;

$r_{f2}^{[2]}(k)$ is a signal received through the second antenna of the receiver on the second block of the subcarrier k;

$h_{f,11}(k)$ is a channel response on the subcarrier k from the first antenna of the transmitter to the first antenna of the receiver;

$h_{f,12}(k)$ is a channel response on the subcarrier k from the second antenna of the transmitter to the first antenna of the receiver;

$h_{f,21}(k)$ is a channel response on the subcarrier k from the first antenna of the transmitter to the second antenna of the receiver;

$h_{f,22}(k)$ is a channel response on the subcarrier k from the second antenna of the transmitter to the second antenna of the receiver;

$x_{f1}(k)=\text{FFT}\{x_1(n)\}$ is a frequency-domain signal corresponding to $x_1(n)$;

$x_{f2}(k)=\text{FFT}\{x_2(n)\}$ is a frequency-domain signal corresponding to $x_2(n)$;

$y_{f1}(k)=\text{FFT}\{y_1(n)\}$ is a frequency-domain signal corresponding to $y^1(n)$; and $y_{f2}(k)=\text{FFT}\{y_2(n)\}$ is a frequency-domain signal corresponding to $y_2(n)$.

It can be easily verified that $$y_{f2}(k) = \begin{cases} x_{f1}^*\left(\frac{N}{2}-k\right), & k = 0, \dots, \frac{N}{2} \\ x_{f1}^*\left(\frac{3N}{2}-k\right), & k = \frac{N}{2}+1, \dots, N-1 \end{cases}, \text{ and}$$

$$y_{f1}(k) = \begin{cases} x_{f2}^*\left(\frac{N}{2}-k\right), & k = 0, \dots, \frac{N}{2} \\ x_{f2}^*\left(\frac{3N}{2}-k\right), & k = \frac{N}{2}+1, \dots, N-1 \end{cases}.$$

Therefore, the received signals can be combined in the following manners:

When k=0, . . . , N/2, $$\begin{cases} r_{f1}^{[1]}(k) = h_{f,11}(k)x_{f1}(k) + h_{f,12}(k)x_{f2}(k) \\ r_{f2}^{[1]}(k) = h_{f,21}(k)x_{f1}(k) + h_{f,22}(k)x_{f2}(k) \\ r_{f1}^{[2]}\left(\frac{N}{2}-k\right) = h_{f,11}\left(\frac{N}{2}-k\right)x_{f2}^*(k) + h_{f,12}\left(\frac{N}{2}-k\right)x_{f1}^*(k) \\ r_{f2}^{[2]}\left(\frac{N}{2}-k\right) = h_{f,21}\left(\frac{N}{2}-k\right)x_{f2}^*(k) + h_{f,22}\left(\frac{N}{2}-k\right)x_{f1}^*(k) \end{cases}.$$

It can be further obtained that:

$$\underbrace{\begin{bmatrix} r_{f1}^{[1]}(k) \\ r_{f2}^{[1]}(k) \\ r_{f1}^{*[2]}\left(\frac{N}{2}-k\right) \\ r_{f2}^{*[2]}\left(\frac{N}{2}-k\right) \end{bmatrix}}_{r(k)} = \underbrace{\begin{bmatrix} h_{f,11}(k) & h_{f,12}(k) \\ h_{f,21}(k) & h_{f,22}(k) \\ h_{f,12}^*\left(\frac{N}{2}-k\right) & h_{f,11}^*\left(\frac{N}{2}-k\right) \\ h_{f,22}^*\left(\frac{N}{2}-k\right) & h_{f,21}^*\left(\frac{N}{2}-k\right) \end{bmatrix}}_{H(k)} \underbrace{\begin{bmatrix} x_{f1}(k) \\ x_{f2}(k) \end{bmatrix}}_{x(k)}$$

A zero-forcing solution is used for x(k) to obtain:

$x(k) = (H^H(k)H(k))^{-1} H^H(k)$, where $(\cdot)^H$ represents calculating a conjugate transpose of a matrix, and $(\cdot)^{-1}$ represents inversion of the matrix.

When k=N/2+1, . . . , N-1, $$\begin{cases} r_{f1}^{[1]}(k) = h_{f,11}(k)x_{f1}(k) + h_{f,12}(k)x_{f2}(k) \\ r_{f2}^{[1]}(k) = h_{f,21}(k)x_{f1}(k) + h_{f,22}(k)x_{f2}(k) \\ r_{f1}^{[2]}\left(\frac{3N}{2}-k\right) = h_{f,11}\left(\frac{3N}{2}-k\right)x_{f2}^*(k) + h_{f,12}\left(\frac{3N}{2}-k\right)x_{f1}^*(k) \\ r_{f2}^{[2]}\left(\frac{3N}{2}-k\right) = h_{f,21}\left(\frac{3N}{2}-k\right)x_{f2}^*(k) + h_{f,22}\left(\frac{3N}{2}-k\right)x_{f1}^*(k) \end{cases}.$$

Similarly, it can be further obtained that:

$$\underbrace{\begin{bmatrix} r_{f1}^{[1]}(k) \\ r_{f2}^{[1]}(k) \\ r_{f1}^{*[2]}\left(\frac{3N}{2}-k\right) \\ r_{f2}^{*[2]}\left(\frac{3N}{2}-k\right) \end{bmatrix}}_{r(k)} = \underbrace{\begin{bmatrix} h_{f,11}(k) & h_{f,12}(k) \\ h_{f,21}(k) & h_{f,22}(k) \\ h_{f,12}^*\left(\frac{3N}{2}-k\right) & h_{f,11}^*\left(\frac{3N}{2}-k\right) \\ h_{f,22}^*\left(\frac{3N}{2}-k\right) & h_{f,21}^*\left(\frac{3N}{2}-k\right) \end{bmatrix}}_{H(k)} \underbrace{\begin{bmatrix} x_{f1}(k) \\ x_{f2}(k) \end{bmatrix}}_{x(k)}.$$

A zero-forcing solution is used for x(k) to obtain:

$x(k) = (H^H(k)H(k))^{-1} H^H(k)$, where $(\cdot)^H$ represents calculating a conjugate transpose of a matrix, and $(\cdot)^{-1}$ represents inversion of the matrix.

$x_{f1}(k)$ and $x_{f2}(k)$ can be obtained by obtaining x(k), and $x_1(n)$ and $x_2(n)$ can be further obtained by performing IFFT on $x_{f1}(k)$ and $x_{f2}(k)$.

In FIG. 24, a single-carrier signal sent by a transmitter includes the following parts:

When a transmit-end device uses a short guard interval (GI), M=480, G=32, and N=512. When the transmit-end device uses a regular GI, M=448, G=64, and N=512. When the transmit-end device uses a long GI, M=384, G=128, and N=512.

Guard intervals GIs of signals sent on the two antennas are the same and both are $\tilde{g}(l)=g(l)$, where l=0, 1, . . . , G−1; and $s_1(m)$ and $s_2(m)$ are t-be-sent single-carrier data signals, where $s_1(m)$ is the first information set, and $s_2(m)$ is the second information set.

Data signals sent through the first antenna of the transmitter are as follows:

A signal sent on the $(2n-1)^{th}$ data block is $x_1(n)$, where n=0 1, . . . , N−1, N=M+G, and $$x_1(n) = \begin{cases} s_1(n), & n = 0, 1, \ldots, M-1 \\ g(n-M), & n = M, \ldots, N-1 \end{cases}.$$

A signal sent on the $2n^{th}$ data block is $y_1(n)$, where n=0, 1, . . . , N−1, N=M+G, and $$y_1(n) = \begin{cases} s_2^*(n), & n = 0, 1, \ldots, M-1 \\ g(n-M), & n = M, \ldots, N-1 \end{cases}.$$

Data signals sent through the second antenna of the transmitter are as follows:

A signal sent on the $(2n-1)^{th}$ data block is $x_2(n)$, where n=0, 1, . . . , N−1, N=M+G, and $$x_2(n) = \begin{cases} s_2(n), & n = 0, 1, \ldots, M-1 \\ g(n-M), & n = M, \ldots, N-1 \end{cases}.$$

A signal sent on the $2n^{th}$ data block is $y_2(n)$, where n=0, 1, . . . , N−1, N=M+G, and $$y_2(n) = \begin{cases} s_1^*(n), & n = 0, 1, \ldots, M-1 \\ g(n-M), & n = M, \ldots, N-1 \end{cases}.$$

Frequency-domain signals that are transmitted through a channel and that are received by a receiver may be in the following form:

It can be easily verified that $$y_{f2}(k) = \begin{cases} x_{f1}^*(k), & k = 0 \\ x_{f1}^*(N-k), & k = 1, \ldots, N-1 \end{cases}, \text{ and}$$

$$y_{f1}(k) = \begin{cases} x_{f2}^*(k), & k = 0 \\ x_{f2}^*(N-k), & k = 1, \ldots, N-1 \end{cases}.$$

Therefore, the received signals can be combined in the following manners:

When k=0, $$\begin{cases} r_{f1}^{[1]}(k) = h_{f,11}(k)x_{f1}(k) + h_{f,12}(k)x_{f2}(k) \\ r_{f2}^{[1]}(k) = h_{f,21}(k)x_{f1}(k) + h_{f,22}(k)x_{f2}(k) \\ r_{f1}^{[2]}(k) = h_{f,11}(k)x_{f2}^*(k) + h_{f,12}(k)x_{f1}^*(k) \\ r_{f2}^{[2]}(k) = h_{f,21}(k)x_{f2}^*(k) + h_{f,22}(k)x_{f1}^*(k) \end{cases}.$$

It can be further obtained that:

$$\underbrace{\begin{bmatrix} r_{f1}^{[1]}(k) \\ r_{f2}^{[1]}(k) \\ r_{f1}^{*[2]}(k) \\ r_{f2}^{*[2]}(k) \end{bmatrix}}_{r(k)} = \underbrace{\begin{bmatrix} h_{f,11}(k) & h_{f,12}(k) \\ h_{f,21}(k) & h_{f,22}(k) \\ h_{f,12}^{*}(k) & h_{f,11}^{*}(k) \\ h_{f,22}^{*}(k) & h_{f,21}^{*}(k) \end{bmatrix}}_{H(k)} \underbrace{\begin{bmatrix} x_{f1}(k) \\ x_{f2}(k) \end{bmatrix}}_{x(k)}.$$

A zero-forcing solution is used for x(k) to obtain:

x(k)=(H$^H$(k)H(k))$^{-1}$ H$^H$(k), where $(\cdot)^H$ represents calculating a conjugate transpose of a matrix, and $(\cdot)^{-1}$ represents inversion of the matrix.

When k=1, ..., N–1, $$\begin{cases} r_{f1}^{[1]}(k) = h_{f,11}(k)x_{f1}(k) + h_{f,12}(k)x_{f2}(k) \\ r_{f2}^{[1]}(k) = h_{f,21}(k)x_{f1}(k) + h_{f,22}(k)x_{f2}(k) \\ r_{f1}^{[2]}(N-k) = h_{f,11}(N-k)x_{f2}^{*}(k) + h_{f,12}(N-k)x_{f1}^{*}(k) \\ r_{f2}^{[2]}(N-k) = h_{f,21}(N-k)x_{f2}^{*}(k) + h_{f,22}(N-k)x_{f1}^{*}(k) \end{cases}.$$

Similarly, it can be further obtained that:

$$\underbrace{\begin{bmatrix} r_{f1}^{[1]}(k) \\ r_{f2}^{[1]}(k) \\ r_{f1}^{*[2]}(N-k) \\ r_{f2}^{*[2]}(N-k) \end{bmatrix}}_{r(k)} = \underbrace{\begin{bmatrix} h_{f,11}(k) & h_{f,12}(k) \\ h_{f,21}(k) & h_{f,22}(k) \\ h_{f,12}^{*}(N-k) & h_{f,11}^{*}(N-k) \\ h_{f,22}^{*}(N-k) & h_{f,21}^{*}(N-k) \end{bmatrix}}_{H(k)} \underbrace{\begin{bmatrix} x_{f1}(k) \\ x_{f2}(k) \end{bmatrix}}_{x(k)}.$$

A zero-forcing solution is used for x(k) to obtain:

x(k)=(H$^H$(k)H(k))$^{-1}$ H$^H$(k), where $(\cdot)^H$ represents calculating a conjugate transpose of a matrix, and $(\cdot)^{-1}$ represents inversion of the matrix.

$x_{f1}(k)$ and $x_{f2}(k)$ can be obtained by obtaining x(k), thereby further obtaining $s_1(m)$ and $s_2(m)$.

In summary, this application provides a single carrier-based data transmission method. The data transmission method includes: generating a first radio frame and a second radio frame, and sending the first radio frame and the second radio frame, where the first radio frame and the second radio frame each include 2N data blocks, the 2N data blocks are arranged in a sequence from a first data block to a 2N$^{th}$ data block, each data block includes a payload part and a guard interval (GI), and the payload parts of the different data blocks are separated using the GIs. The value of the payload part of the $(2n-1)^{th}$ data block of the first radio frame includes the first information set, the value of the payload part of the $(2n-1)^{th}$ data block of the second radio frame includes the second information set, the value of the payload part of the $2n^{th}$ data block of the first radio frame includes a conjugate of the second information set, and the value of the payload part of the $2n^{th}$ data block of the second radio frame includes a conjugate of the first information set, where n=1, 2, ..., N, and N is an integer greater than 0. By using the foregoing manner, data transmission robustness can be improved and data transmission for a longer distance can be supported.

It should be noted that the single carrier-based data transmission methods in Embodiments 7 and 8 can be implemented by using the single carrier-based data transmission apparatus in Embodiment 4. The baseband processor is configured to implement the frame generation process in Embodiments 7 and 8, and the transceiver is configured to implement the frame transmitting and receiving processes in Embodiments 7 and 8. The single carrier-based data transmission methods are described in detail in Embodiments 7 and 8, and corresponding single carrier-based data transmission apparatus embodiments are not described again.

Based on the foregoing descriptions of the implementations, persons skilled in the art may clearly understand that embodiments of the present invention may be implemented by software in addition to a necessary universal hardware platform or by hardware only. In most circumstances, the former is a preferred implementation. Based on such an understanding, the technical solutions of the present invention essentially or the part contributing to the prior art may be implemented in a form of a software product. The software product is stored in a readable storage medium, such as a floppy disk, a hard disk, or an optical disc of a computer, and includes several instructions for instructing a computer device (which may be a personal computer, a server, or a network device) to perform the methods described in the embodiments of the present invention.

What is claimed is:

1. A single carrier-based data transmission method, wherein the method comprises:
    generating a frame, wherein a data part of the frame comprises 2N data blocks, the 2N data blocks are arranged in a sequence from a first data block to a 2N$^{th}$ data block, each data block comprises a payload part and a guard interval (GI), payload parts of different data blocks are separated by GIs, and a payload part of a $2n^{th}$ data block is obtained by multiplying a payload part of a $(2n-1)^{th}$ data block by a phase-shift sequence, wherein n=1, 2, ..., N, and N is an integer greater than 0; and
    sending the frame.

2. The method according to claim 1, wherein a phase-shift coefficient of the phase-shift sequence is stipulated in a standard, and the phase-shift coefficient comprises: 90°, 180°, or 270°.

3. The method according to claim 1, wherein a signaling part of the frame comprises a phase field, and the phase field comprises 1 bit, wherein: when the phase field is a first value, a phase-shift coefficient of the phase-shift sequence is 0°; or when the phase field is a second value, a phase-shift coefficient of the phase-shift sequence is 180°.

4. The method according to claim 1, wherein a signaling part of the frame comprises a phase field, and the phase field comprises at least 2 bits, wherein: when the phase field is a first value, a phase-shift coefficient of the phase-shift sequence is 0°; when the phase field is a second value, a phase-shift coefficient of the phase-shift sequence is 90°; when the phase field is a third value, a phase-shift coefficient of the phase-shift sequence is 180°; or when the phase field is a fourth value, a phase-shift coefficient of the phase-shift sequence is 270°.

5. The method according to claim 3, wherein before the generating a frame, the method further comprises:
    receiving channel feedback information, wherein the channel feedback information comprises the phase-shift coefficient.

6. The method according to claim 1, wherein a payload part of a data block comprises 448 symbols, and a guard interval of a data block comprises 64 symbols.

7. A single carrier-based data transmission apparatus, wherein the apparatus comprises:
- a baseband processor configured to generate a frame, wherein a data part of the frame comprises 2N data blocks, the 2N data blocks are arranged in a sequence from a first data block to a $2N^{th}$ data block, each data block comprises a payload part and a guard interval (GI), payload parts of different data blocks are separated by GIs, and a payload part of a $2n^{th}$ data block is obtained by multiplying a payload part of a $(2n-1)^{th}$ data block by a phase-shift sequence, wherein n=1, 2, . . . , N, and N is an integer greater than 0; and
- a transceiver configured to send the frame.

8. The apparatus according to claim 7, wherein a phase-shift coefficient of the phase-shift sequence is stipulated in a standard, and the phase-shift coefficient comprises: 90°, 180°, or 270°.

9. The apparatus according to claim 7, wherein a signaling part of the frame generated by the baseband processor comprises a phase field, and the phase field comprises 1 bit, wherein: when the phase field is a first value, a phase-shift coefficient of the phase-shift sequence is 0°; or when the phase field is a second value, a phase-shift coefficient of the phase-shift sequence is 180°.

10. The apparatus according to claim 7, wherein a signaling part of the frame generated by the baseband processor comprises a phase field, and the phase field comprises at least 2 bits, wherein: when the phase field is a first value, a phase-shift coefficient of the phase-shift sequence is 0°; when the phase field is a second value, a phase-shift coefficient of the phase-shift sequence is 90°; when the phase field is a third value, a phase-shift coefficient of the phase-shift sequence is 180°; or when the phase field is a fourth value, a phase-shift coefficient of the phase-shift sequence is 270°.

11. The apparatus according to claim 9, wherein before the baseband processor generates the frame, the transceiver is further configured to receive channel feedback information, wherein the channel feedback information comprises the phase-shift coefficient.

12. The apparatus according to claim 7, wherein a payload part of a data block comprises 448 symbols, and a guard interval of a data block comprises 64 symbols.

13. A non-transitory computer readable medium storing computer executable instructions that when executed by a processor instruct the processor to:
- generate a frame, wherein a data part of the frame comprises 2N data blocks, the 2N data blocks are arranged in a sequence from a first data block to a $2N^{th}$ data block, each data block comprises a payload part and a guard interval (GI), payload parts of different data blocks are separated by GIs, and a payload part of a $2n^{th}$ data block is obtained by multiplying a payload part of a $(2n-1)^{th}$ data block by a phase-shift sequence, wherein n=1, 2, . . . , N, and N is an integer greater than 0; and
- send the frame.

14. The non-transitory computer readable medium of claim 13, wherein a phase-shift coefficient of the phase-shift sequence is stipulated in a standard, and the phase-shift coefficient comprises: 90°, 180°, or 270°.

15. The non-transitory computer readable medium of claim 13, wherein a signaling part of the frame comprises a phase field, and the phase field comprises 1 bit, wherein:
- when the phase field is a first value, a phase-shift coefficient of the phase-shift sequence is 0°; or when the phase field is a second value, a phase-shift coefficient of the phase-shift sequence is 180°.

16. The non-transitory computer readable medium of claim 13, wherein a signaling part of the frame comprises a phase field, and the phase field comprises at least 2 bits, wherein: when the phase field is a first value, a phase-shift coefficient of the phase-shift sequence is 0°; when the phase field is a second value, a phase-shift coefficient of the phase-shift sequence is 90°; when the phase field is a third value, a phase-shift coefficient of the phase-shift sequence is 180°; or when the phase field is a fourth value, a phase-shift coefficient of the phase-shift sequence is 270°.

17. The non-transitory computer readable medium of claim 15, wherein before generating the frame, computer executable instructions when executed by the processor further instruct the processor to receive channel feedback information, wherein the channel feedback information comprises the phase-shift coefficient.

18. The non-transitory computer readable medium of claim 13, wherein a payload part of a data block comprises 448 symbols, and a guard interval of a data block comprises 64 symbols.

* * * * *